Nov. 4, 1969     O. J. SUNDSTRAND     3,476,313

CALCULATING MACHINE WITH SHORT CUT MULTIPLICATION

Filed July 26, 1967     12 Sheets-Sheet 1

Inventor:
Oscar J. Sundstrand
Gradolph, Love, Rogers & Van Sciver
Attorneys

Nov. 4, 1969 O. J. SUNDSTRAND 3,476,313
CALCULATING MACHINE WITH SHORT CUT MULTIPLICATION
Filed July 26, 1967 12 Sheets-Sheet 2
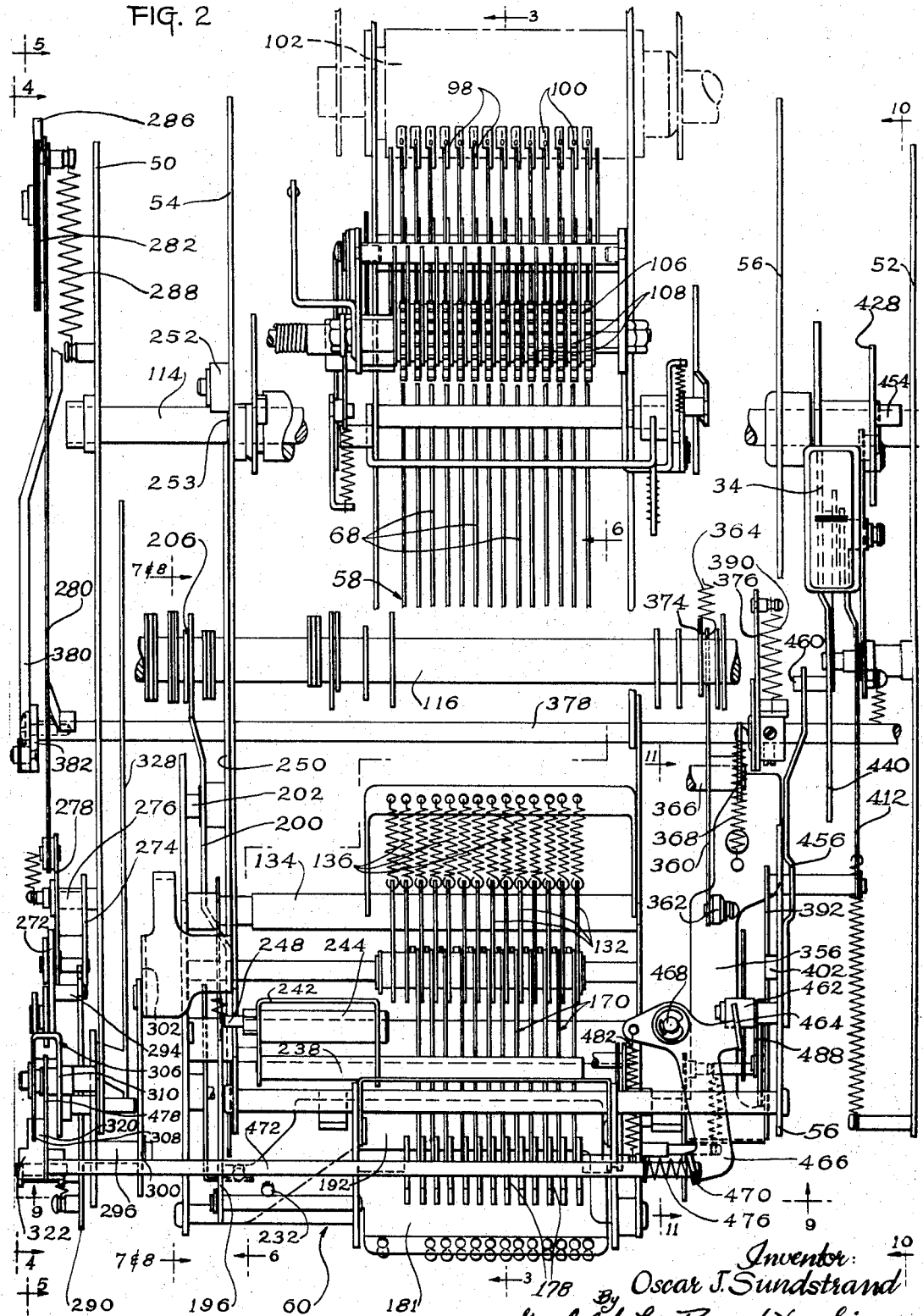

Nov. 4, 1969  O. J. SUNDSTRAND  3,476,313
CALCULATING MACHINE WITH SHORT CUT MULTIPLICATION
Filed July 26, 1967  12 Sheets-Sheet 4
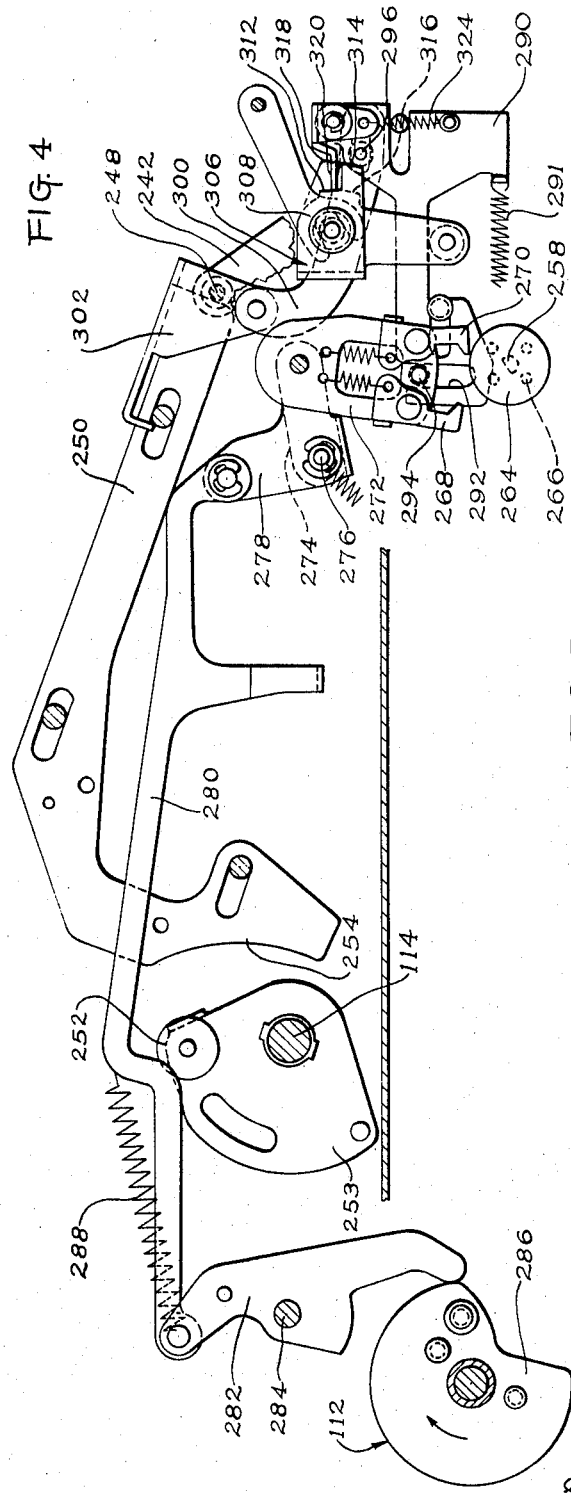
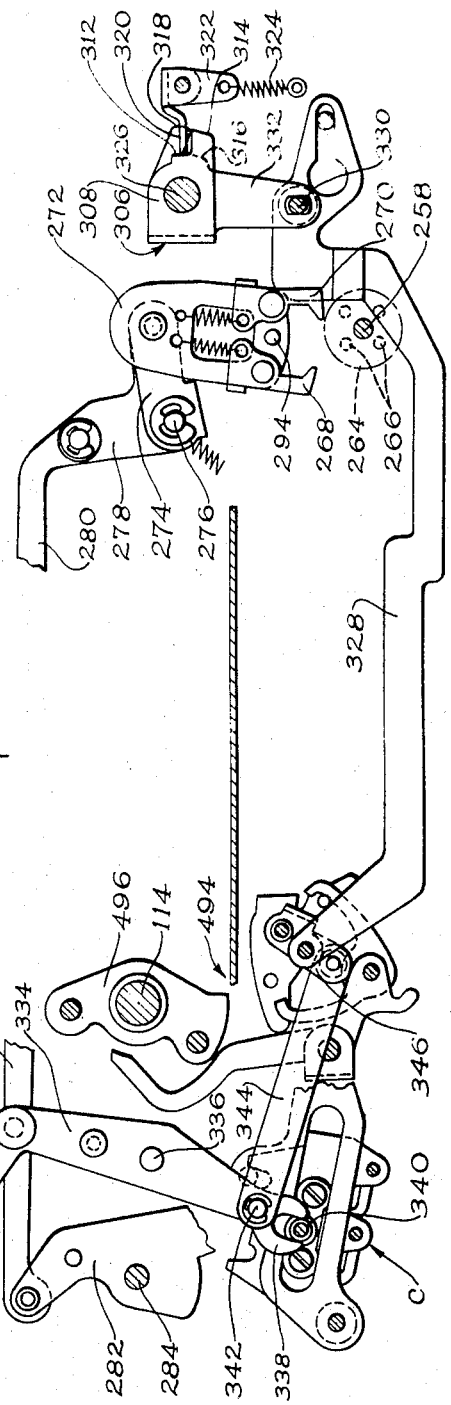
Inventor:
Oscar J. Sundstrand
By Gradolph, Love, Rogers & Van Sciver
Attorneys

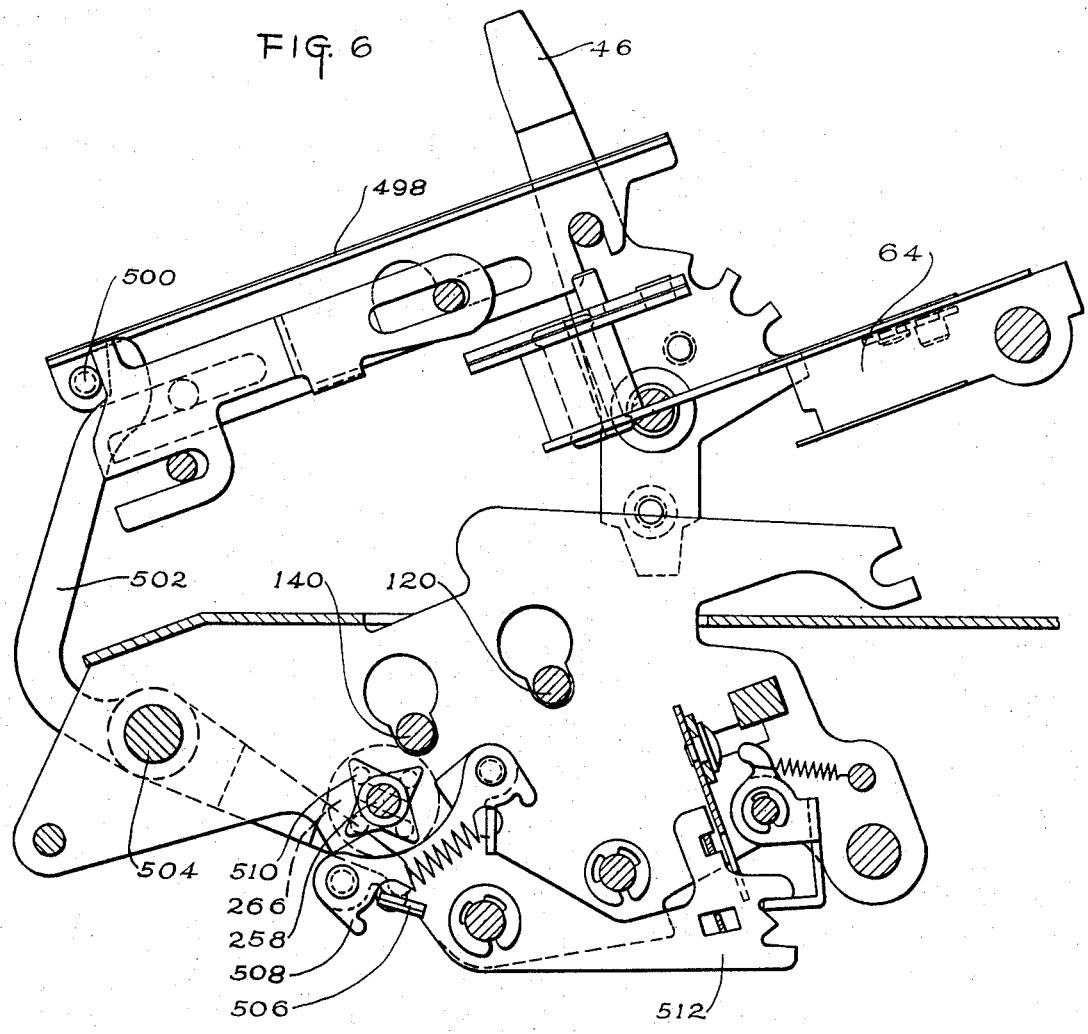

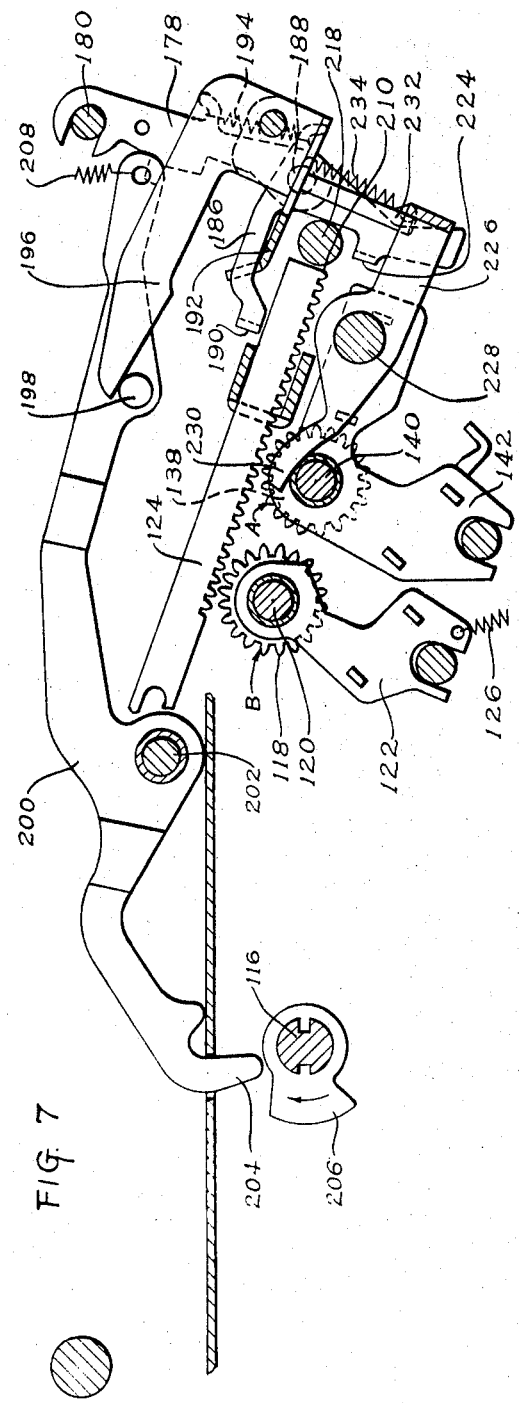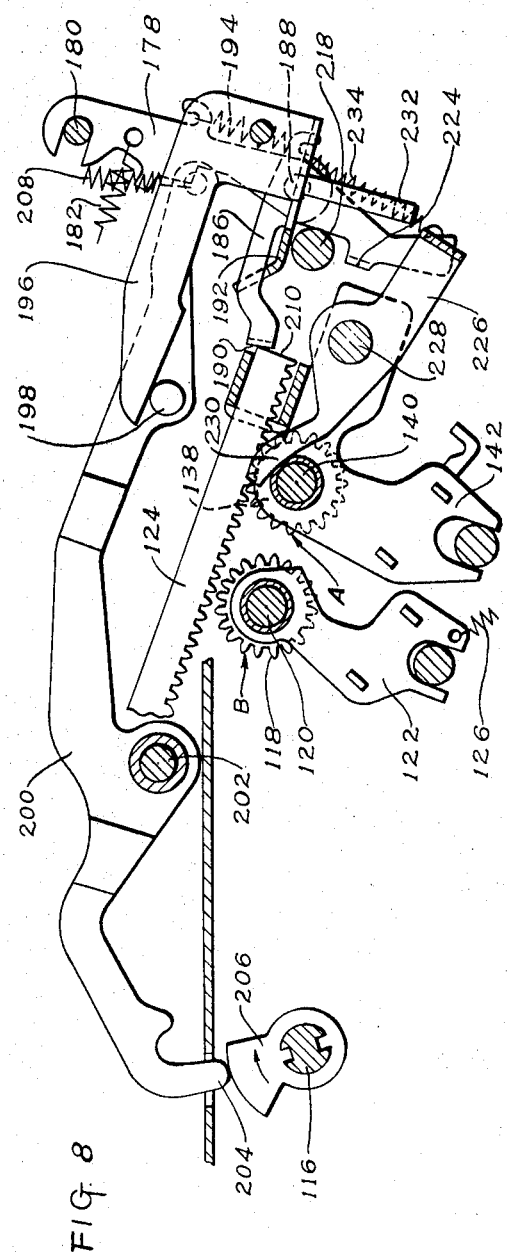

Nov. 4, 1969  O. J. SUNDSTRAND  3,476,313
CALCULATING MACHINE WITH SHORT CUT MULTIPLICATION
Filed July 26, 1967  12 Sheets-Sheet 8

Inventor:
Oscar J. Sundstrand
By
Bradolph, Love, Rogers & Van Sciver
Attorneys

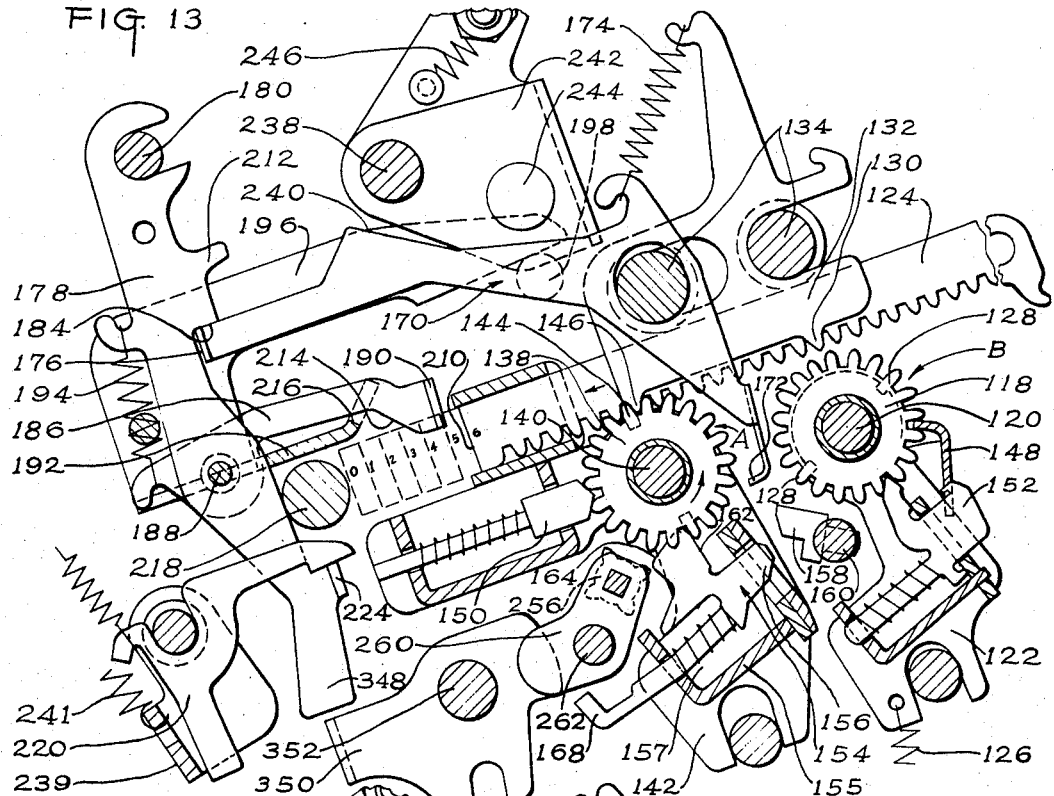
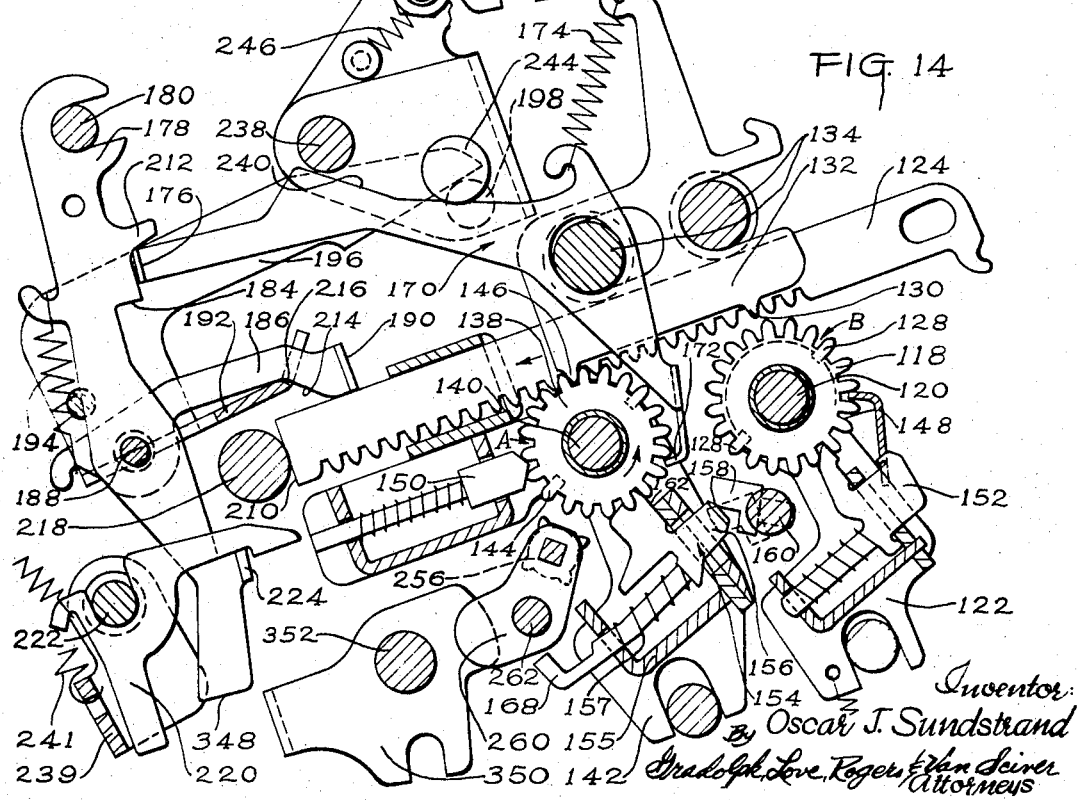

Inventor:
Oscar J. Sundstrand
By Gradolph, Love, Rogers & Van Saivet
Attorneys

Inventor:
Oscar J. Sundstrand
By Gradolph, Love, Rogers & Van Saiver
Attorneys

United States Patent Office 3,476,313
Patented Nov. 4, 1969

3,476,313
CALCULATING MACHINE WITH SHORT CUT MULTIPLICATION
Oscar J. Sundstrand, West Hartford, Conn., assignor to Victor Comptometer Corporation, Chicago, Ill., a corporation of Illinois
Filed July 26, 1967, Ser. No. 656,267
Int. Cl. G06c 29/00
U.S. Cl. 235—60                    21 Claims

ABSTRACT OF THE DISCLOSURE

A calculating machine having numeral keys, function control keys, a function selector key, an accumulator, a B and an A register to receive the multiplicand and multiplier respectively in a problem of multiplication, a movable actuator for each column, a pivotally mounted lever associated with each actuator and rotated by a pusher engaged by its respective actuator when the latter is moved a distance corresponding to an entered number in the multiplier greater than 5, an advancing pawl for each number column other than the unit column and moved to add 1 to the entered multiplier number in its column when the number entered in the next lower column is greater than 5, a retaining latch engaged for each lever when the lever is pivoted, a subtract selector element movable transversely with the B register, drive means including spring loaded lost motion to rotate the subtract selector element on each operation of the machine during counting out of the A register under the control of the B register, the selector element being engageable with the levers to sense whether they have been pivoted, and a linkage operated by the subtract selector element to shift the accumulator to subtract position to effect multiplication by complementary subtraction in those columns where the multiplier digit is greater than 5. The machine includes linkage to control the subtract selector element during multiplication by a negative multiplier which produces a credit total.

CROSS-REFERENCES TO RELATED PATENTS

The invention is disclosed with respect to a machine of the type shown and described in the prior patents of Oscar J. Sundstrand, Nos. 2,834,542, dated May 13, 1958, and 2,984,412, dated May 16, 1961.

BACKGROUND OF THE INVENTION

In general, short cut multiplication is a common expedient not only in calculating machines but in actual manual practice, whereby instead of repeated addition of the multiplicand, the multiplicand is multiplied by a power of ten and the differences between the digits of the multiplier and ten are subtracted from the product. Another way of expressing the process of multiplication by addition and subtraction may be accomplished by the multiplication of the larger digits of the multiplier, adding thereto a unit of the next highest order of the multiplier, and subtracting the differences between the digit value and ten. For example, if the multiplicand is to be multiplied by a simple multiplier of 7, it will ordinarily require the machine, by a process of repeated addition, to perform seven cycles of addition plus other necessary cycles to complete the totalizing and printing operations, whereas by short cut multiplication the machine will automatically operate to multiply the multiplicand by ten and then to subtract from such interim product the multiplicand three times, namely, the difference between 7 and 10 plus such additional cycles as may be necessary for total taking and printing operations.

Thus, in the problems of multiplication by calculating machines, it is in the course of 40% of the calculations simpler to add ten to the multiplier and then subtract from that product the multiplicand a number of times which is the difference between 10 and the multiplier digit. This invention has, for its purpose, providing improved means for accomplishing this desired result by decreasing the number of cycles to perform the problem of multiplication.

Ordinarily, it is of little advantage to use short cut multiplication when the majority of the digits in the multiplier are 5 or less. When the majority of the digits in the multiplier are 6 or greater, a substantial advantage in lessened number of machine cycles required for solution of the problem is obtained.

It is, therefore, the primary object of this invention to provide an improved means incorporated in a calculating machine, whereby the machine may operate to compute problems of multiplication by the so called short cut method.

Another object is to provide an improved mechanism for short cut multiplication in a calculating machine, wherein if the digit of the multiplier is 0, no machine cycle will take place.

Other objects and advantages will become apparent from the following description taken in conjunction with the accompanying drawings.

DESCRIPTION OF THE INVENTION FIGURES

FIG. 2 is a fragmentary plan view of the machine implementing the short cut method of multiplication, with some parts being shown in phantom lines and other parts omitted which are not involved in the operation, and it may be considered as being taken generally along the line 2—2 of FIG. 3, looking in the direction of the arrows;

FIG. 4 is a view taken along the line 4—4 of FIG. 2, looking in the direction of the arrows and inwardly from the left side of the machine, to illustrate part of the operating linkage;

FIG. 5 is a view looking inwardly from the left side of the machine, illustrating additional operating linkage, and may be considered as being taken along the line 5—5 of FIG. 2;

FIG. 6 is a view taken along the irregular line 6—6 of FIG. 2, looking leftwardly and showing the operation selector control and linkage to immobilize the addback feature needed in problems of division;

FIGS. 7 and 8 are enlarged views, taken in the same plane, looking rightwardly toward the calculating section of the machine, showing two stages of the relationship of the cam shaft control with the multiplication method selector and may be considered as taken along the lines 7—7, 8—8 of FIG. 2, looking in the direction of the arrows;

FIG. 13 is a sectional view similar to FIG. 12, showing the parts and the positions they occupy at the beginning of the rack return upon entry of a number greater than 5 into the A register;

FIG. 14 is a sectional view similar to FIGS. 12 and 13, showing the parts and the positions they occupy at the end of the rack return stroke when a number greater than 5 has been entered into the A register;

Figure 18:
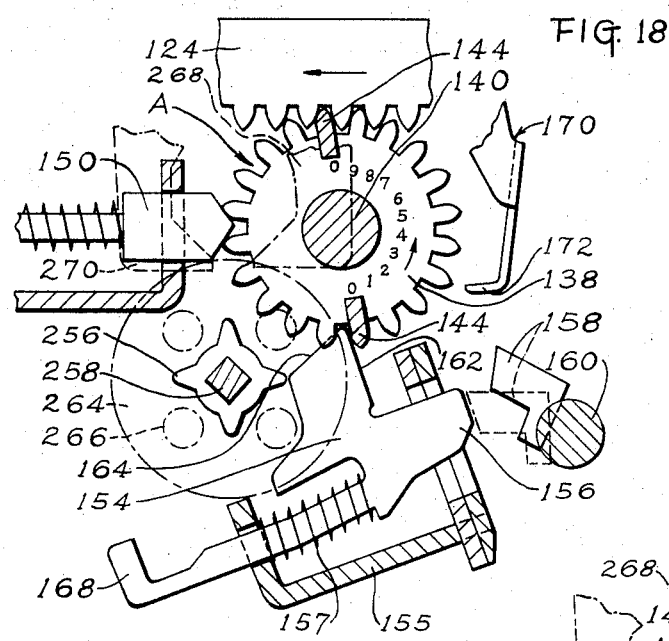
FIG. 18 is an enlarged transverse sectional view through the A register, showing the calculating gear in zero position and in engagement at the stop prior to entry of a number into the gear.
Figure 19:
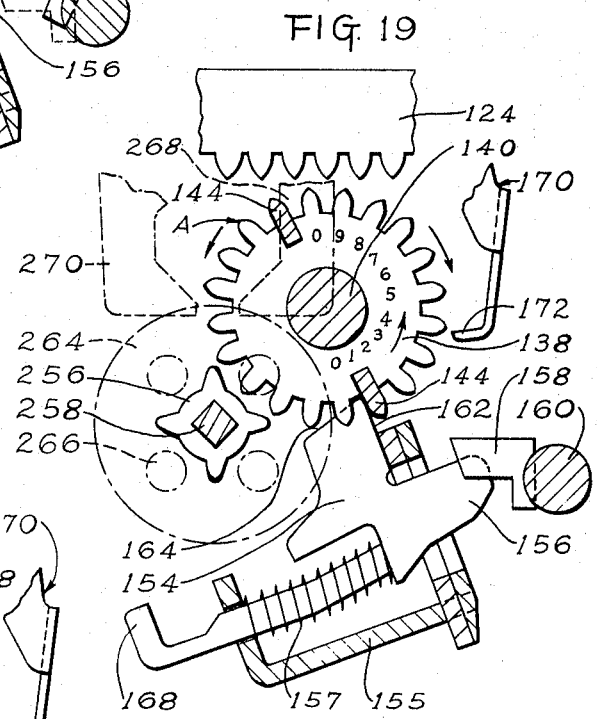
Figure 20:
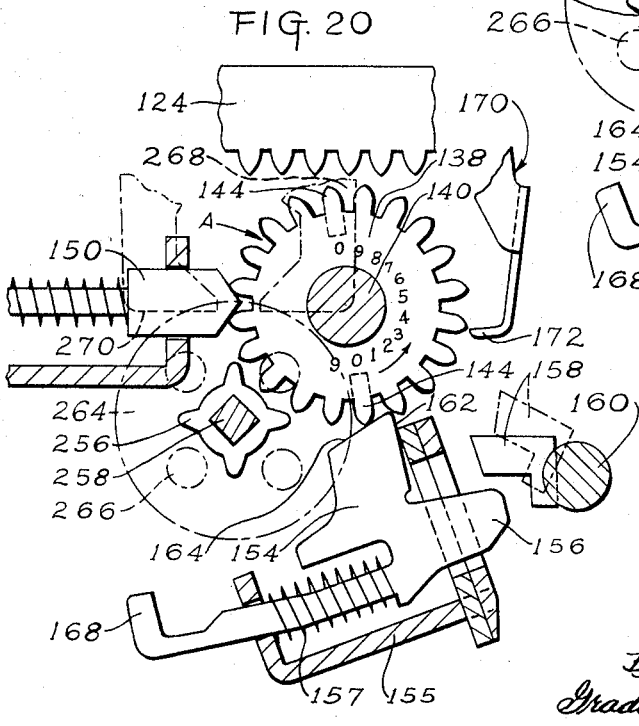

FIG. 19 is a sectional view similar to FIG. 18, showing the number 1 entered into the calculating gear, and the calculator stop in set position to stop the B register; and FIG. 20 is a sectional view similar to FIG. 18, showing the calculating gear after it has moved from the number 9 position to 0 position in the counterclockwise direction and has cammed the B register stop out of blocking position to permit the B register to escape to the next denominational order.

General

Figure 1:
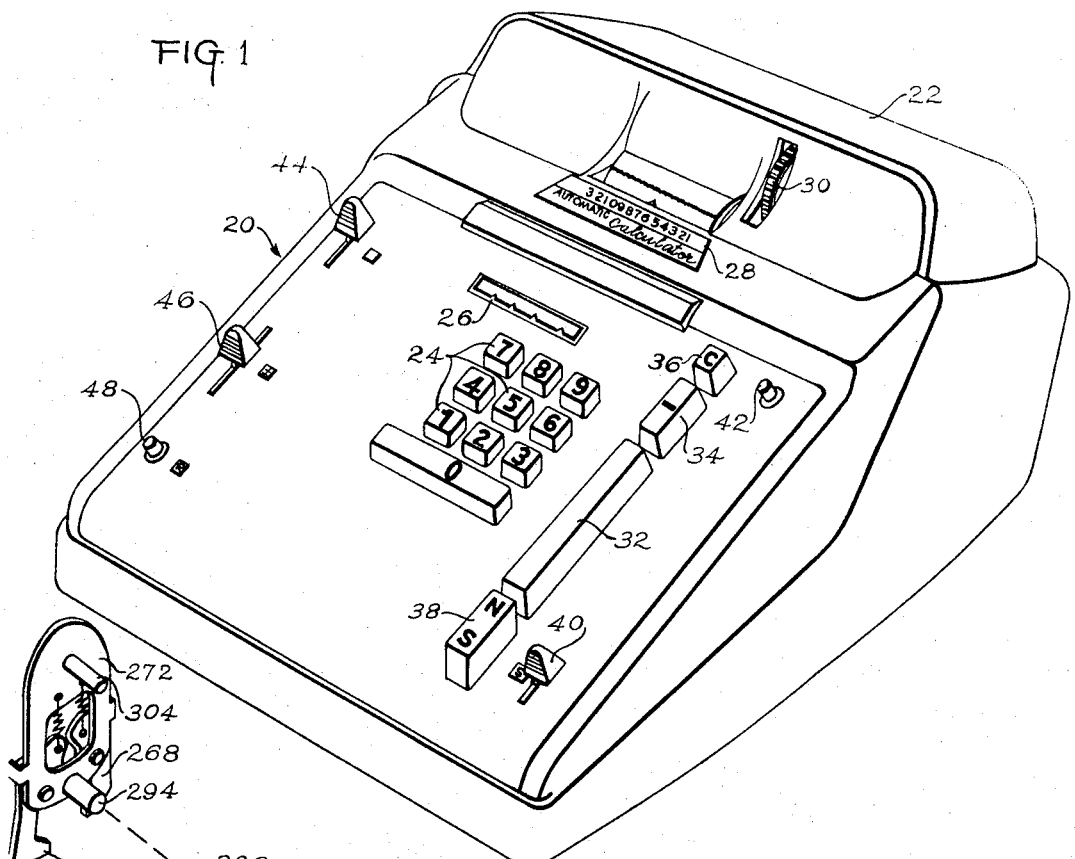
FIG. 1 is a perspective view of a printing calculating machine showing the keyboard and the various control keys, buttons, and bars.

As shown in FIG. 1, the machine 20 comprises a case 22 provided with the usual number keys 24, a column indicator 26, a decimal indicator 28, and a knurled twirler knob 30 for manually advancing the paper tape. The control keys include a motor bar add-total control 32, a subtract key 34, a correction key 36, a combination nonadd and subtotal key 38, a preselect total or subtotal key 40, a stop button 42, a memory constant key 44, a selective multiply-add-subtract-divide key 46, and a recall button 48.

Figure 3:
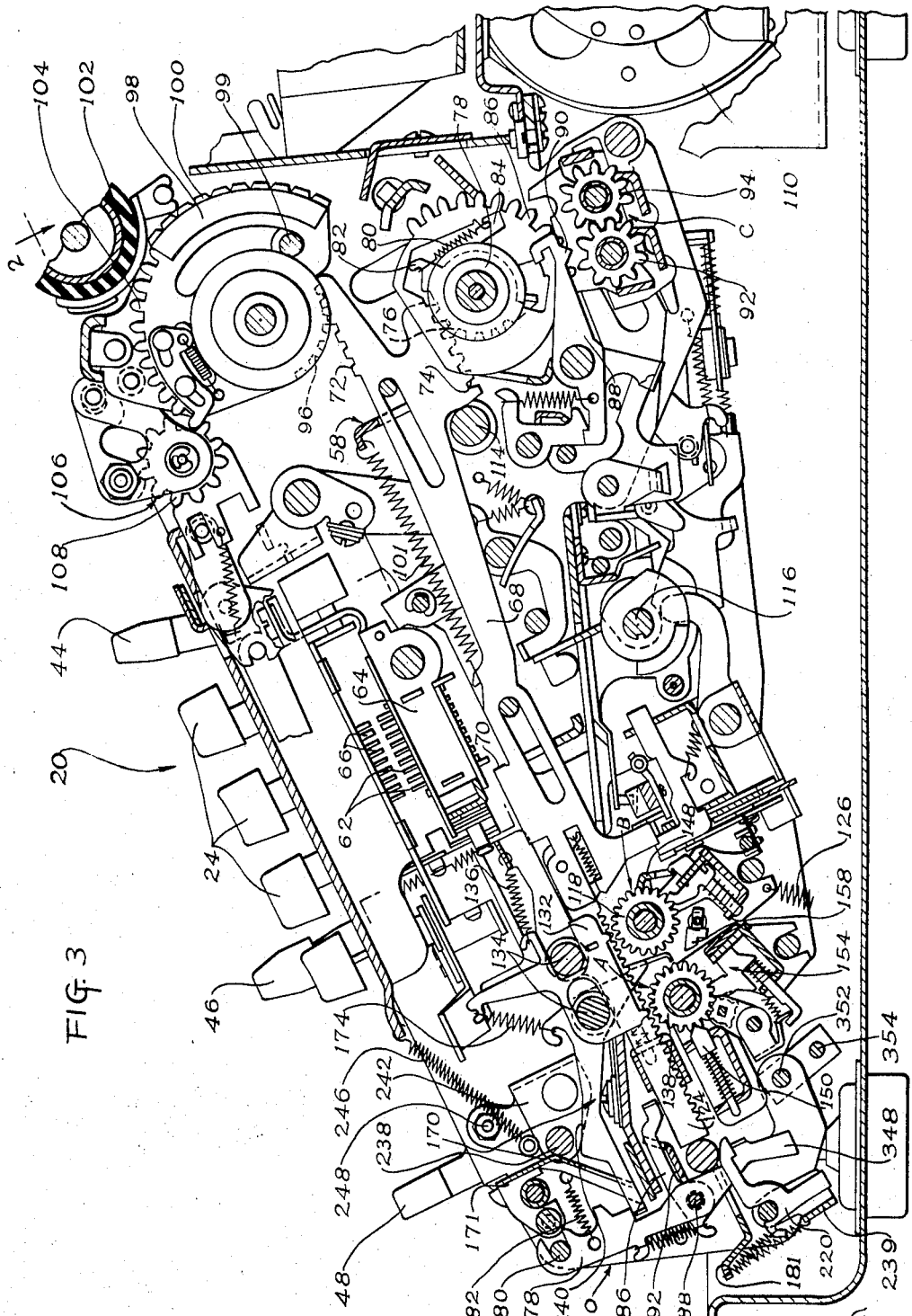
FIG. 3 is a medial vertical sectional view through the machine, taken along the line 3—3 of FIG. 2, looking in the direction of the arrows.

The more general organization of the calculating machine can be seen from FIGS. 2 and 3 which show the left and right outer frame members 50 and 52, the left and right inner frame plates 54 and 56, a center section 58, and a calculating section 60 operatively connected to the center section 58 in a manner more clearly described hereinafter.

The number keys 24 when operated depress stop pins 62 of a conventional stop pin carriage 64 mounted for transverse movement relative to the lower ends of stems 66 of the number keys 24. The amount entered in the machine, as represented by the depressed pins 62, is picked up by actuators 68 through the engagement of their lugs 70 with the depressed stop pins. The actuators 68 are provided with racks 72 and 74.

The racks 74 respectively engage with gear segments 76 mounted for limited pivotal movement on hubs 78, being normally urged counterclockwise by tension springs 80 connected between ears 82 on the segments 76 and ears 84 on larger gear segments 86. A limited movement between the gear segments 76 and 86 is provided to effect transfers or carryovers whenever an associated transfer pawl 88 is tripped by engagement of its nose 90 with the tens transfer tooth on either of the two intermeshed associated accumulator pinions 92 or 94 which comprise the C register, depending on whether the operation is one of addition or subtraction. The transfer mechanism, the accumulator engaging and disengaging mechanism, and the accumulator shifting mechanism from adding to subtracting position are well known in the art.

The rack 72 is in mesh with a segmental gear 96 which forms part of a type sector 98 carrying the usual type 100 and cooperable with the inking ribbon, paper tape, and platen 102. The type sector 98 has a gear sector 104 which is cooperable with a recall unit 106 which includes a pinion 108 for each gear sector 104 and provides the dual function of aligning or rectifying the type sectors 98 and providing a means for recalling the last amount entered into the machine by the number keys 24 or by a machine operation such as subtotal, total, and the like.

The machine is powered by an electric motor 110 which drives a one revolution clutch mechanism 112 connected to drive in a known manner a main shaft 114 through about 100° and return. The clutch also is connected to drive a restoring bail 99 cooperable with the sectors 98 to release them for rearward movement of the actuators 68 by the springs 101 in a well known manner.

The main shaft 114 and a cam shaft 116 are driven from the one revolution clutch 112 by linkage and a toothed stepping drive, insofar as the cam shaft is concerned, in the manner shown in FIGS. 44 and 45 of the above mentioned Sundstrand Patent No. 2,834,542. The cam shaft 116 is longitudinally slidable in the machine and is moved between an inoperative position when the add-subtract-multiply-divide key 46 is in the add-subtract or division positions, to an operative position when this key is in the position for multiplication. The cam shaft mounts a number of cams which control the programming of the machine, as more fully explained in the foregoing patents and as will become apparent hereinafter.

Multiplication

In a problem of multiplication, the multiplicand is entered in to the B register and the multiplier is separately entered in to the A register (FIG. 3, 7, 8, and 12 to 14). The B register comprises a plurality of gears 118 mounted for free rotation upon a shaft 120. The B register is mounted on a pair of slides 122 which are guided for movement of the B register gears 118 into and out of engagement with rack bars 124 which are connected to the ends of the actuator slides 68. The B register is also mounted for transverse sliding movement in the calculating section 60 for the purpose of counting out the A register and transferring to the accumulator or C register the appropriate amount for each denominational order as dictated by the multiplier stored in the A register. The B register is biased to its normal position by a spring 126 which is connected between one of the slides 122 and a fixed frame element of the calculating section 60.

It will be noted that each of the gears 118 is fitted with a pair of diametrically disposed sidewardly extending teeth 128, one of which is adapted to engage a stop tooth 130 on the total-subtotal stop member 132 during the clockwise rotation of the gears by the racks 124 during a calculating operation. The total-subtotal stop members are mounted for sliding movement on the shafts 134 and are biased into alignment by springs 136.

The A register comprises a plurality of gears 138 mounted for free rotation on a shaft 140 which is carried in slides 142 so that the A register may be brought into and out of engagement with the rack bars 124. The mechanism for selectively bringing the A and B registers into engagement with the rack bars 124 is disclosed in FIGS. 25 through 30 of the above mentioned Patent No. 2,834,542. The gears 138 are formed with teeth having lateral extensions 144 thereon 180° apart, one of which is adapted to engage a stop tooth 146 on the total-subtotal stop member 132. It will be noted from FIGS. 18 through 20 that these lateral lugs on the teeth are in the zero numeral position. When the A and B registers have been completely cleared of any numerals stored therein, one of the sidewardly extending lugs 128 will have engaged the stop tooth 130 and one of the sidewardly extending lugs 144 will have engaged the stop tooth 146.

The gears 118 of the B register are maintained in aligned position by a bar detent 148 which is swung out of the way as incident to movement of the B register, into engagement with the racks 124 and is returned to engaged position as the B register moves away from the racks in order to hold the multiplicand in the register.

The gears 138 of the A register are engaged by a spring pressed detent 150 at all times which has a wide angle nose thereon to hold the gears of the A register in their set position, but not so firmly that they cannot be moved during counting out of the A register during the calculating cycle of the machine.

The B register has associated with it a plurality of stop pawls 152 which are adapted to be engaged by the second of the sidewardly extending lugs 128 on the B register gears 118. These pawls do not enter into the present invention and will not further be considered.

The A register includes a plurality of stop pawls 154 movably carried in a frame 155 and having noses 156 thereon adapted to be projected by springs 157 into the path of a transversely moving stop 158 carried by the B register. The stop 158 is mounted on an angularly movable shaft 160 and when the shaft and stop 158 are in the indexing position, as shown in dotted lines in FIG. 14 and full lines in FIG. 19, the B register will be stopped in its transverse movement and the digits stored in the gear 138 of the A register will be counted out under the control of the multiplicand which is stored in the B register.

The A register pawls 154 include a stop face 162 and a camming surface 164 which are adapted to cooperate with the second of the lugs 144 on the A register gears 138. As the gears 138 move clockwise in the counting out thereof, the lug 144 will engage the face 162 as the last digit is counted out and move the stop pawl 154 from projected or stopping position to withdrawn position, thereby releasing the stop 158 of the B register for indexing to the next denominational order. This clockwise movement of the gears 138 occurs during normal multiplication by series of addition. When the counting out of the A register is effected by the counterclockwise rotation of the gears 138, the lug 144 engages the cam surface 164 depressing the pawl 154 in the manner shown in FIG. 20 to move the nose 156 from engagement with the stop 158, thereby permitting the B register to be indexed to the next denominational order. This counterclockwise movement of the gears 138 occurs during the short cut multiplication technique which will be described in greater detail hereinafter. A restoring bail 166 (FIG. 12) carried by the B register, is adapted to engage tails 168 of the stop pawls 154 and to move them all to the withdrawn position shown in FIG. 12 upon the actuation of the stop button 42 in the event it is desired to terminate the problem of multiplication before it has been completed. In the usual completion of a problem in multiplication the stop powls 154 are in withdrawn position at its completion. If any denominational digit in the multiplier is zero, the corresponding stop pawl 154 will not be projected and the B register will escape to the next denominational order.

Selection for multiplication method

The mechanism which determines whether the calculating machine will multiply by repeated addition in the normal fashion or by the short cut method of entering one in the next higher denominational column and subtracting, is shown most clearly in FIGS. 12 through 17. This mechanism includes an advancing pawl 170 for each of the gears 138 in the A or multiplier register except that in the units column. The advancing pawl has a finger 172 adapted to engage beneath a tooth of the A register gear 138 and in the position shown in FIG. 14 to index this gear one tooth as the A register moves out of engagement with the racks 124. The pawls 170 are mounted for rocking and sliding movement on the shaft 134 above the A register in the calculating section. The pawls 170 are restrained against lateral movement by a guide comb 171 and are biased into engagement with the gears 138 by springs 174 connected between a hook on the pawl and a hook on the total-subtotal stop member 132. The pawls are restrained from engagement with the gears 138 by engagement of their outer ends 176 with generally vertically extending levers 178 which have their upper and generally open rearwardly facing slotted ends pivoted on a fixed shaft 180 and are guided near their lower ends by a comb 181. Each lever is biased to the FIG. 12 position by a spring 182 and has a shoulder 184 intermediate its ends against which the outer ends 176 of the advancing pawls 170 normally engage.

The levers 178 are moved from their normal position (FIG. 12) to an advancing pawl released position by means of pushers 186, there being one associated with each lever 178 and pivoted at 188 thereto intermediate the ends thereof. At their rearward ends each pusher 186 has a flanged face 190 adapted to be held out of operating position by a comb 192, but biased to be engaged by the racks 124 by spring 194 connected between a hook on the lever and the forward end of the pusher face 190. The comb 192 normally holds the end faces 190 of the pushers slightly above the path of movement of the racks 124 in order to prevent their acting as a drag on the racks during their rearward stroke which enters an amount into the A or B register respectively. The comb 192 is integral with an L-shaped arm 196 (FIGS. 7 and 8) which extends upwardly and rearwardly and has its rearward end overlying and against a stud 198 carried on a long lever 200 pivoted at 202 so that its rearward end projects downwardly through an opening in the bottom plate to be engaged by a cam 206. In FIG. 7, the cam is shown in the position it occupies at the end of the first cycle of the machine when the multiplicand has been entered into the B register. In FIG. 8, it is shown during the second cycle of the machine while the multiplier is being entered into the A register. At the conclusion of this cycle, when the machine enters its third cycle for calculation, the cam will be rotated sufficiently in the clockwise direction so that the rear end 204 of the lever 200 will leave the high point of the cam and a spring 208 at the forward end of the lever 200 will pivot it in the counterclockwise direction about the pivot 202, thus lifting the L-shaped arm 196 by the stud 198, to raise the pushers 186 away from the racks 124 and restore them to the position shown in FIG. 12. The pushers 186 are thus held out of engagement with the racks during the calculating cycles and will not interfere with their free movement.

In actuation of the rack bars 124 to enter the multiplier into the A register, for those rack bars where the digit to be entered in a particular denominational column is 5 or less, the movement rearwardly of the rack bar 124 will be insufficient to clear the end 190 of the pusher 186 which will remain resting upon the upper edge of the bar and the amount will be stored into the gear 138 of the A register by rotation thereof in the counterclockwise direction (FIGS. 12 to 14) the appropriate number of steps. On the other hand, if the number to be entered into the A register is 6 or more, then the rack bar will be moved rearwardly a distance sufficient to clear the end 190 of the pusher 186 and the spring 194 will drop it into the path of the rack bar on its return or forward stroke (FIG. 13). The forward edge 210 of the rack bar 124 will engage the rear face of the pusher and urge it forwardly from the position shown in FIG. 13 to slightly beyond that shown in FIG. 14. This movement of the pusher will pivot the lever 178 about its point 180, thereby moving the shoulder 184 from above the forward or outer end of the advancing pawl 170 and the spring 174 will move this pawl up against a stop 212 on the lever 178. As the pushers 186 are moved forwardly by the rack bars 124, they are moved sufficiently so that a camming surface 214 on their under sides engages the ends 216 of the slots in the comb 192 to cam them upwardly and above the top edge of the rack so that with a slight overtravel, the pushers will be cammed out of the way of the racks 124, which are then permitted to return to their forward position against the stop bar 218.

As the appropriate lever 178 is pivoted in its clockwise direction to its maximum position it permits an L-shaped latch 220 pivoted at 222, which has its rearward hooked end normally resting on an ear 224 of the lever 178, to engage the ear 224 and to restrain the restoring movement of the lever in the counterclockwise direction under the influence of the biasing spring 182. This holds the lever 178 in the position so that the subtract mechanism can be operated during the appropriate portions of the calculating cycle for a short cut multiplication operation.

It should be noted that the comb 192 is retained in the position to hold the pushers 186 out of engagement with the racks 124 on the rearward movement of the latter by a latch 230 overlying the shaft 140 of the A register (FIG. 7). The latch engages behind a downwardly extending pin 232 carried by the L-shaped lever 196 at its lower forward portion to prevent movement of the lever 196 in the counterclockwise direction, and thus movement of the pushers 186 against the tops of the racks 124. However, when the A register is moved into engagement with the racks for their forward movement, the latch 226 is pivoted in the clockwise direction about the pivot 228, thereby releasing the pin 232 so that the pushers can move to their operative positions on top of the racks 124 to determine whether, for any denominational order, multiplication by way of repetitive addition or short cut multiplication is to be desired. This position is shown in FIG. 8. When the A register is restored to its normal position out of engagement with the racks 124, a spring 234 will move the latch 226 in the counterclockwise direction as far as it will go, and initially it will hit the end of the pin 232. However, when the lever 200 restores the comb 192 to its normal position and lifts the pushers 186 from the upper edges of the racks 124, the latch will engage the pin and restrain it against movement until there is a subsequent entry of an amount into the A register.

Figure 12:
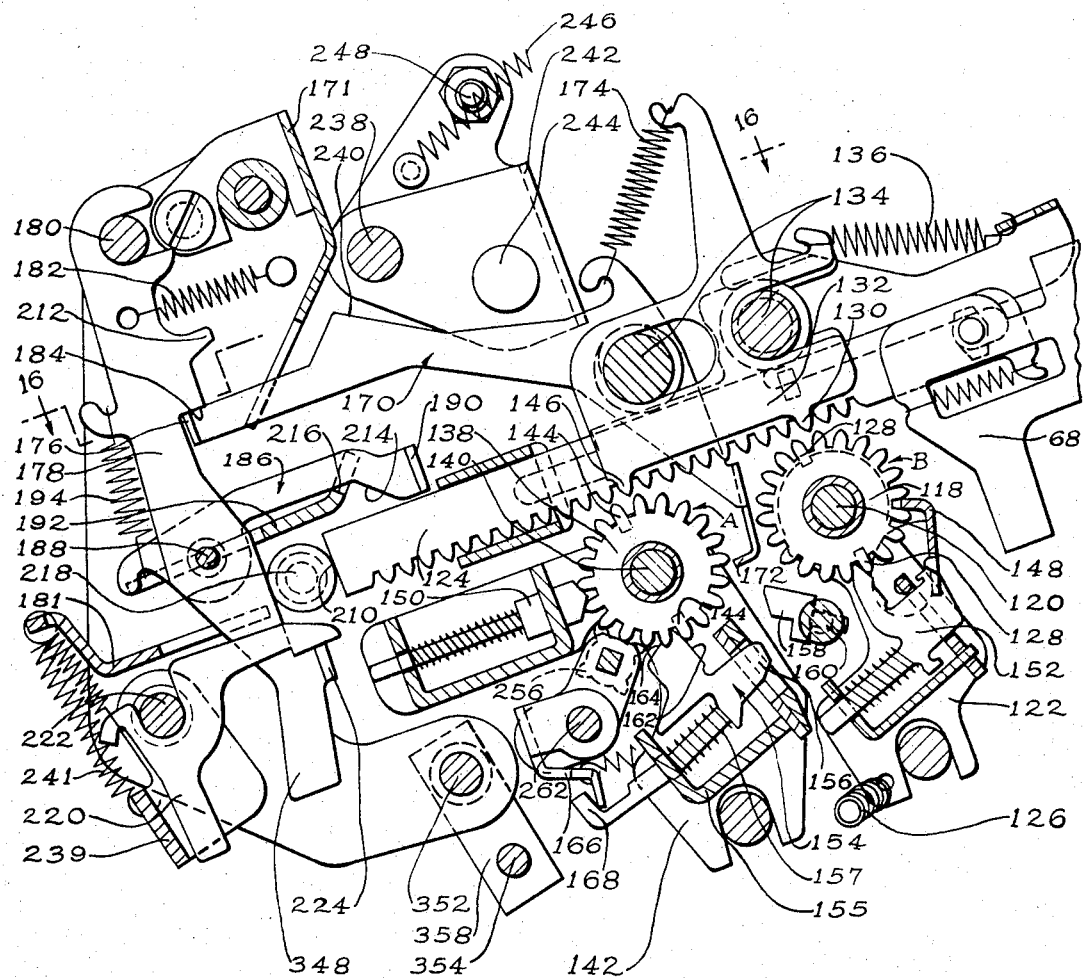
FIG. 12 is an enlarged fragmentary sectional view looking leftwardly through the calculating section of the machine, and the A and B registers, the forward ends of the rack bars and associated linkage showing the parts in their normal or out position.

A restoring bail 238 overlies the advancing pawls 170, and in particular a cam surface 240 thereof. This restoring bail is actuated at every stroke of the machine and is carried in a yoke 242 pivoted at 244 to the left inner frame plate 54. The yoke is biased in the clockwise direction by a spring 246, and its upper end carries a sidewardly extending pin 248 which projects through an opening in the plate 54 to be engaged by a forward end of a slide 250 (FIGS. 2 and 4). The slide 250 is mounted for reciprocating movement only and is operated on each stroke of the machine from the main shaft 114. As the main shaft is rotated in the clockwise direction (FIG. 4) a roller 252 carried on a plate 253 fixed to the main shaft engages an arcuate cam surface 254 in the rearward downwardly extending portion of the slide 250. Thus, on every stroke of the machine the roller 252 engages the cam surface 254, moving the slide 250 forwardly, against the force of a biasing spring (not shown), to rock the pin 248 forwardly or in the counterclockwise direction as seen in FIGS. 12 through 14, thereby bringing the bail 238 into engagement with the cam surfaces 240, moving the forward ends 176 of the pawls 170 downwardly and away from the shoulders 184. Ordinarily this has no effect unless the pawl end 176 is against the upper stop 212 (FIG. 14), in which case it releases the lever 178 for movement to its normal or restored position, provided the latch 220 has been disengaged from the ear 224. The latches 220 are released at the end of the calculating cycle by a bail 239 carried on the pivot 222, and normally held out of engagement with the latches by a spring 241.

Counting out "A" register

Referring primarily to FIGS. 12 through 14 and 18 through 20, it will be seen that the A register is counted out by engagement of the gears 138 thereof with a four tooth gear 256 mounted for sliding movement on a square shaft 258 which is mounted for rotation in both clockwise and counterclockwise direction in the frame of the calculating section 60. The four tooth gear 256 is carried between a pair of guiding spacers 260 slidably mounted on a shaft 262 also carried in the frame of the calculating section. The spacers 260 are connected to the B register and are movable transversely of the A register so that the gear 256 can be brought into engagement with the individual gears 138 of the A register during the counting out operation which occurs during the third or calculating cycle of the machine. Thus, as the B register escapes from one denominational order to the next lower order, the gear 256 is carried similarly from one denominational order to the next lower. (See the aforementioned Patent No. 2,834,542, FIGS. 6, 8, 15, and 23, and column 26, line 19 to column 27, line 7.)

Referring in addition to FIGS. 4 and 5, it will be seen that at its left end the shaft 258 carries a disc 264 on which are mounted four short studs 266 corresponding to the four teeth of the gear 256. The studs are engageable by one or the other of a pair of feet 268 and 270 mounted on a count arm 272 which is arranged for pivotal and reciprocating motion on a crank arm 274 pivoted to the outer side frame plate at 276. Integral with the crank arm 274 is an L-shaped arm 278 which has its upper end pivotally connected to a link 280 extending rearwardly in the machine to a lever 282 pivoted at 284, which has an end maintained in engagement with a cam 286 by a spring 288. The cam 286 is driven by the one revolution clutch mechanism 112 so that at every stroke of the machine the count arm 272 is pivoted to move vertically about the pivot 276.

Figure 9:
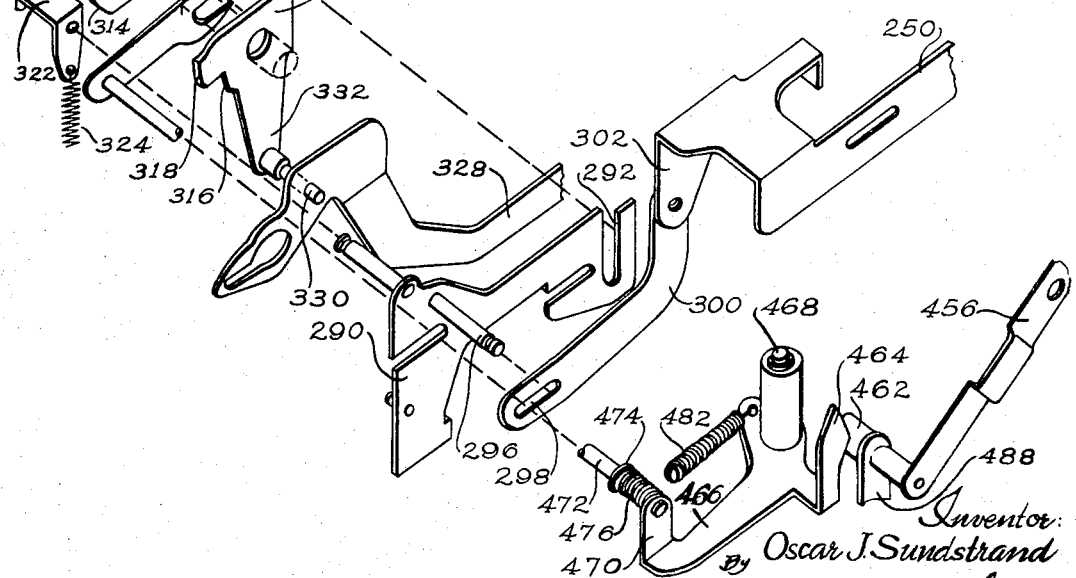
FIG. 9 is an exploded perspective view of a portion of the linkage and rod interconnecting the left and right sides of the machine at the front thereof.

The position of the count arm 272 relative to the counting disc 264 is determined by a slide 290 (FIGS. 4 and 9) which has a vertical slot 292 adjacent its rear end in which reciprocates a stud 294 carried on the inner side of the count arm 272 and between the feet 268 and 270. A stud 296 projecting inwardly of the slide extends through a slot 298 in an L-shaped arm 300 carried on an offset portion 302 of the slide 250. Thus, at the forward stroke of the slide 250, the arm 300 is moved forwardly, engaging the rear end of the slot with the stud 296, moving the slide 290 forwardly, which pivots the count arm 272 about its pivot 304 to bring the pawls 268 and 270 into operative position relative to the studs 266 on the disc 264.

The count arm 272 is positioned with respect to the disc 264 to rotate it in the clockwise direction (FIGS. 4 and 5) when multiplication is to be effected by repetitive addition. On the other hand, the count arm 272 is positioned to rotate the disc 264 in the counterclockwise direction when the multiplication is to be effected in counting out the A register by repetitive subtraction. Thus, the pawl 270 steps the disc 264 one-quarter of a revolution in the clockwise direction for each addition stroke, and the pawl 268 steps the disc 264 in the counterclockwise direction for each subtraction stroke.

The position of the slide 290 which is biased rearwardly by the spring 291 determines the precise position of the count arm 272 with respect to the disc 264 for either addition multiplication, or subtraction multiplication. In FIGS. 4 and 5 the arm is shown in the position for multiplication by repetitive addition. This position is determined by a yoke shaped arm 306 havng a pair of legs 308 and 310. It will be observed from FIGS. 4, 5, and 9 that the leg 308 has a pair of vertically offset shoulders 312 and 314, and that the leg 310 has a similar pair of shoulders 316 and 318 which are inverted from the shoulders 312 and 314. The shoulders 312 and 314 position the slide 290 for multiplication of positive numbers, and the shoulders 316 and 318 position the slide 290 for multiplication by a negative multiplier.

The stop shoulders on the legs 308 and 310 are adapted to be engaged by a sensing finger 320 carried at the rearward side of a yoke 322 pivotally mounted on the upper left of the slide 290 and biased in the upward direction by a centering spring 324.

The position of the yoke 306 from the normal or multiplication by addition position, which is shown in FIGS. 4 and 5, to multiplication by repetitive subtraction, is obtained by pivoting the yoke 306 in a counterclockwise direction on the mounting shaft 326 by movement of a link 328 forwardly so that its forward end, which is pivotally connected at 330, to the downwardly extending portion 332 of the yoke leg 310, may move it sufficiently to bring the stop shoulder 314 into a position to be engaged by the sensing finger 320. The link 328 is shifted by movement of the C register from the add position to the subtract position under the influence of the mechanism shown in FIG. 10, to be described hereinafter. This mechanism rocks a lever 334 about its pivot 336, the lever 334 being connected to the C register by its forked lower end 338 engaging a roller 340. Adjacent its forked lower end the lever 334 is pivoted at 342 to a connecting link 344 which in turn is connected to a crank arm 346 pivotally connected to the link 328. Thus, a counterclockwise rotation of the lever 334 moves the link 344 forwardly, rotates the crank 346 in the counterclockwise direction to bring the stop shoulder 314 into position to be engaged by the sensing finger 320. This limits the rearward movement of the slide 290 which is reciprocated at each stroke of the machine, thereby causing the pawl 268 on the count arm 272 to engage the stud 266 on the disc 264 and to rotate that disc one-quarter revolution in the counterclockwise direction for each stroke of the machine during the short cut multiplication portion of the cycle.

Counting out by addition or subtraction

Figure 10:
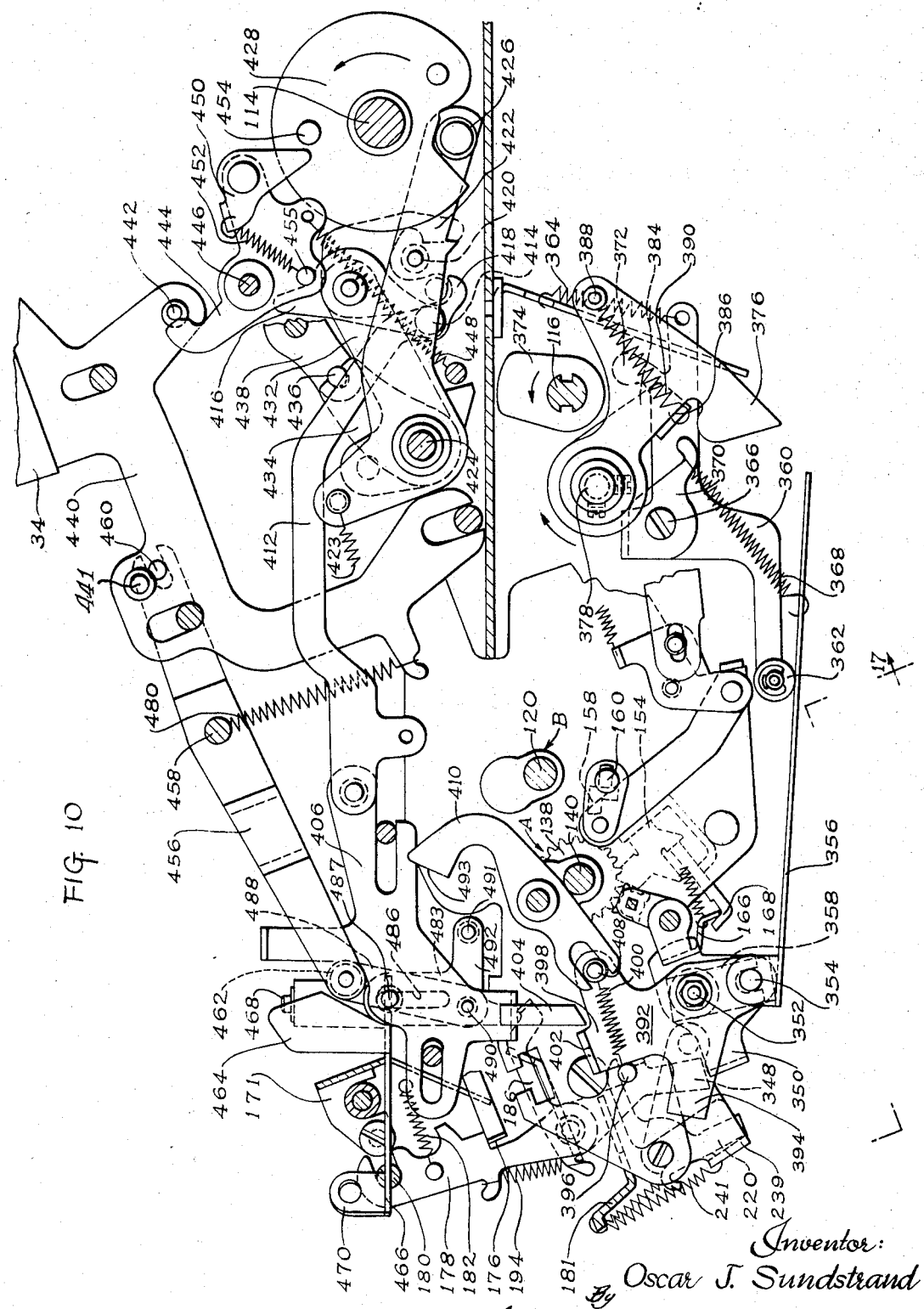
FIG. 10 is an enlarged view taken along the line 10—10 of FIG. 2, looking in the direction of the arrows, showing the subtract control slide, the drive for operating the short cut multiplication control, and the linkage for multiplication by a negative multiplier.

The mechanism for sensing whether the A register has been conditioned for counting out in repetitive addition or repetitive subtraction of the B register into or out of the C register, is shown in FIG. 10. FIGS. 10 and 12 show the lever 178 in position to control counting out the A register by repetitive addition. FIG. 14 shows the lever in position for counting out by repetitive subtraction. When in position for repetitive addition, the foot 348 of the lever 178 is in position to block the clockwise rotation of a subtract selector element 350 which is mounted for sliding movement on a shaft 352, and it has its rearward portion engaged between the spacers 260 movable along the rod 262 by the B register as it is escaped from one denominational order of the A register to the next lower during the counting out of the A register. The lower end of the subtract selector element is forked to receive a shaft 354 extending across the calculating section to a drive plate 356 to which it is pivotally connected. The shaft 354 is carried in the lower end of a pair of pivot arms 358 pivotally mounted on the shaft 352.

The drive plate 356 is in its normal position (FIG. 10) when the machine is set for adding, subtracting, or dividing. It is held in that position by a bell crank 360 having a roller 362 in contact with the upper surface of the plate, and biased to that position by a spring 364 on the opposite side of pivot 366 from the roller. A spring 368 connects the plate 356 with an arm 370 on the bell crank, holding the plate 356 against the roller.

The bell crank has an upwardly and slightly rearwardly extending projection 372 lying in the path of a cam 374 carried by the cam shaft 116. The cam is shown in the position that it occupies at the beginning of a multiplication problem in the machine. During the first cycle of the machine when the multiplicand is being entered into the B register, the cam shaft rotates the cam 374 72° in the counterclockwise direction. When the multiplier is entered into the A register, the cam shaft rotates the cam 374 another 72° in the counterclockwise direction. This movement is insufficient to bring the high point of the cam into contact with the projection 372. However, at the start of the third or calculating cycle of the machine, the cam is rotated in a counterclockwise direction 55½°, bringing its high point into contact with the extension 372. This movement is sufficient to depress the right-hand extension of the bell crank, lifting the roller 362 so as to raise the plate 356 into the path of movement of a drive arm 376.

The drive arm 376 is mounted for free rotation on the outer end of automatic total control shaft 378. This shaft is reciprocated at every stroke of the machine and is driven from a link 380 through a crank 382 from one of the group of cams driven from the one revolution clutch 112 (FIG. 2). Fixed to the shaft 378 is a crank arm 384 having an ear 386 projecting under the central portion of the drive arm 376. A spring 390 connects this ear to a stud 388 on the upper rear portion of the drive arm 376. Thus, at each stroke of the machine the automatic total control shaft reciprocates first in the clockwise and then in the counterclockwise direcion (FIG. 10) to drive the crank 384 in the clockwise direction and the spring 390 causes the drive arm 376 to follow. When the rear end of the plate 356 is out of the path of the striking surface of the drive arm 376, the plate is not moved and the arm goes through an idle stroke. On the other hand, when the cam 374 has rotated the bell crank 360 in the clockwise direction, the spring 368 lifts the plate 356 into position to be struck by the drive arm 376, which contacts its rear surface on each stroke. If the subtract selector element 350 is in a position to engage the foot 348 of one of the levers 178, the plate 356 is moved a very short distance, and the lost motion connection between the crank 384 and the drive arm 376 permits the driving stroke of the arm to be arrested. On the other hand, if the lever 178 is in the position shown in FIG. 14, the selector element is permitted a full stroke in the clockwise direction by a full movement of the plate 356 forwardly of the machine, and the machine is conditioned for a subtraction operation.

A multiple arm lever 392 is pivoted on the shaft 352 and connected to be positively driven by the shaft 354 and plate 356 in the clockwise direction (FIG. 10). See also FIG. 11. It has a first arm 394 adapted to be pivoted against a stop 396 which limits its movement in the clockwise direction. A second arm 398 is also adapted to be brought against the stop 396 in the reverse movement of the lever 392 by a spring 400. The arm 398 includes a sidewardly extending lug 402 which is adapted to engage downwardly projecting arm 404 of a slide 406. Another arm on the lever 392 carries a stud 408 which forms one anchor for the spring 400 and engages in the slotted forward end of a negative multiplier subtract control hook 410 mounted on a fixed pivot between its two ends. The clockwise rotation of the element 392 between its two extreme positions moves the slide 406 rearwardly and pivots the hook 410 in the counterclockwise direction, but with a positive multiplier there is no contact between the hook and the slide.

At its rear end the slide 406 is pivotally connected to a link 412, the rear end of which is pivoted at 414 to a subtract hook 416 to move the hooked end 418 thereof into engagement with stud 420 which is carried on a pivoted lever 422 between pivot shaft 424 therefor and a roller 426 carried at its rear end in engagement with a cam 428 mounted on the main shaft 114. The cam 428 is rotated first in the counterclockwise direction nearly 100°, and then in the clockwise direction during the rearward and return portions of the machine stroke. The first portion of this cam operation, therefore, pivots the arm 422 in the clockwise direction against the force of spring 423 as the roller 426 moves up onto the high point of the cam, and causes the stud 420 which has been engaged by the hook end 418 to pull downwardly. This moves the subtract hook 416 in the clockwise direction about the shaft 424 inasmuch as it is carried on the end of an L-shaped arm 432, fixed on the shaft 424. As the shaft 424 is rotated in the clockwise direction under the impetus of the cam 428, it also rotates a crank arm 434 which has its outer end engaged with a pin 436 carried by a lever 438, only a portion of which is shown in FIG. 10, which is then pivoted in the counterclockwise direction. This lever 438 is connected in a manner shown in one of the aforesaid Sundstrand patents, No. 2,984,412, to the lever 334 for shifting the C register from the add position therein shown to the subtract position, and the machine will thereupon carry out a problem of multiplication by subtraction.

At the end of counting out the A register the element 350 will move rightwardly of the lever 178 corresponding to the units column and on the machine stroke which clears the B register it will rotate in the counterclockwise direction (FIG. 15) to engage an inwardly projecting stud 437 carried on arm 439 for the bail 239 to move the bail against the downwardly extending legs of the latches 220 to release them from the lugs 224. Since the advancing pawls 170 are also depressed by the bail 238 on this stroke of the machine, the springs 182 will restore the levers 178 to the normal position shown in FIG. 12.

Multiplication with a negative multiplier

Multiplication with a negative multiplier is effected by operating the subtract key 34 at the time the multiplier is entered into the A register of the machine. It can, of course, be used to enter the multiplicand into the machine, but negative multiplication will not be effected with a negative multiplicand and a positive multiplier, only with a negative multiplier. The key 34 operates a subtract slide 440 which is mounted on the right outer frame. The slide 440 carries a stud 442 which engages under a latch lever 444 pivoted at 446 which holds the slide in depressed position during entry of the multiplier. The latch is urged into engagement with the stud by a spring 448 and is released by a release pawl 450 pivoted to the latch and held in operative position by a spring 452, the pawl being engaged by a stud 454 carried on the cam 428. In the counterclockwise rotation of the cam the stud 454 idly moves the pawl in the clockwise direction about its pivot and against the spring 452, while in the clockwise rotation of the cam the stud engages the release pawl 450 to disengage the latch 444 from the stud 442.

The latch lever 444 carries a stud 455 which is in engagement with the subtract hook 416, and when it is moved into latching position it rotates the subtract hook 416 into engagement with the stud 420, thereby to effect shifting of the C register to the subtract position, as previously described.

Figure 17:
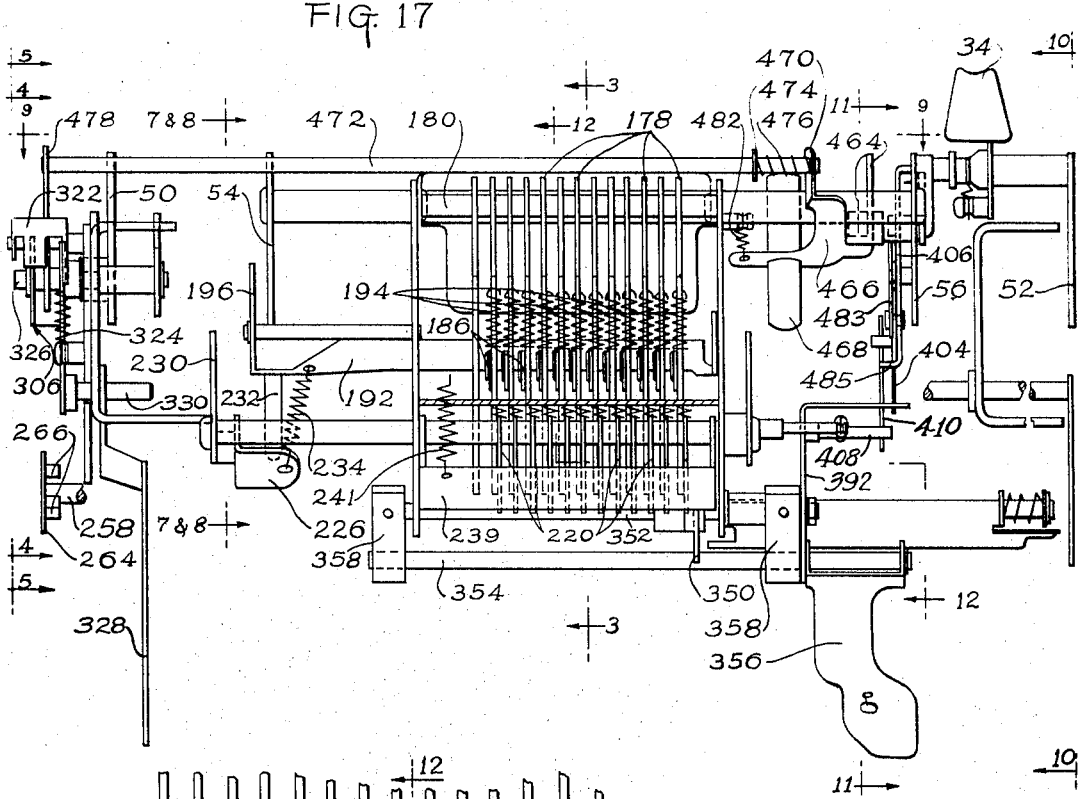
FIG. 17 is a frontal elevational view of a portion of the linkage, looking inwardly from the left side of FIG. 3, or looking upwardly from the bottom of FIG. 2.
Figure 16:
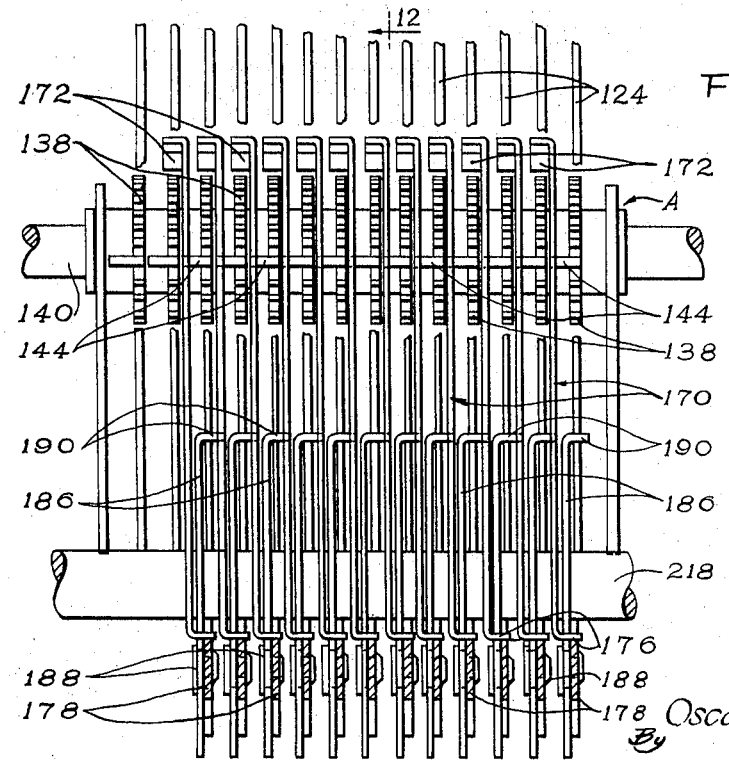
FIG. 16 is a plan sectional view, taken along the line 16—16 of FIG. 12, looking in the direction of the arrows.

Depressing the key 34 pivots a lever 456 about its pivot 458. The lever has a forked rear end in engagement with a stud 460 carried on the slide 440. Thus, as the slide is depressed, the lever is pivoted in the clockwise direction and its forward end which carries a roller 462 moves upwardly. The roller is in engagement with a vertically extending cam plate 464 which is integral with a lever 466 mounted on a vertical pivot 468. The outer end of the lever 466 has a vertically standing ear 470 through which extends a rod 472 carrying a washer 474 between which and the ear 470 is confined a spring 476 urging the two apart and the rod leftwardly (FIGS. 2 and 17). The rod 472 extends across to the left side of the machine and has its end fixed to a lever 478 pivoted on the shaft 326 between the legs 308 and 310 of the yoke 306. Clockwise rotation of the lever 456 (FIG. 10) is translated into clockwise rotation of the lever 466 (FIG. 2) about the pivot 468 and leftward movement of the rod 472 across the front of the machine to shift the yoke 306 from the position in which the sensing finger 320 normally engages the stop shoulders 312 and 314 to the position in which the sensing finger 320 normally engages the stop shoulders 316 and 318 which determine the cycles of multiplication by repetitive addition or multiplication by repetitive subtraction, i.e., short cut multiplication during multiplication by a negative multiplier.

A spring 480 urges the subtract slide 440 and key 34 to the normal retracted position, and a spring 482 urges the lever 466 in the counterclockwise direction about the pivot 460 which tends to move all of the elements to the position shown in FIGS. 2 and 10.

Figure 11:
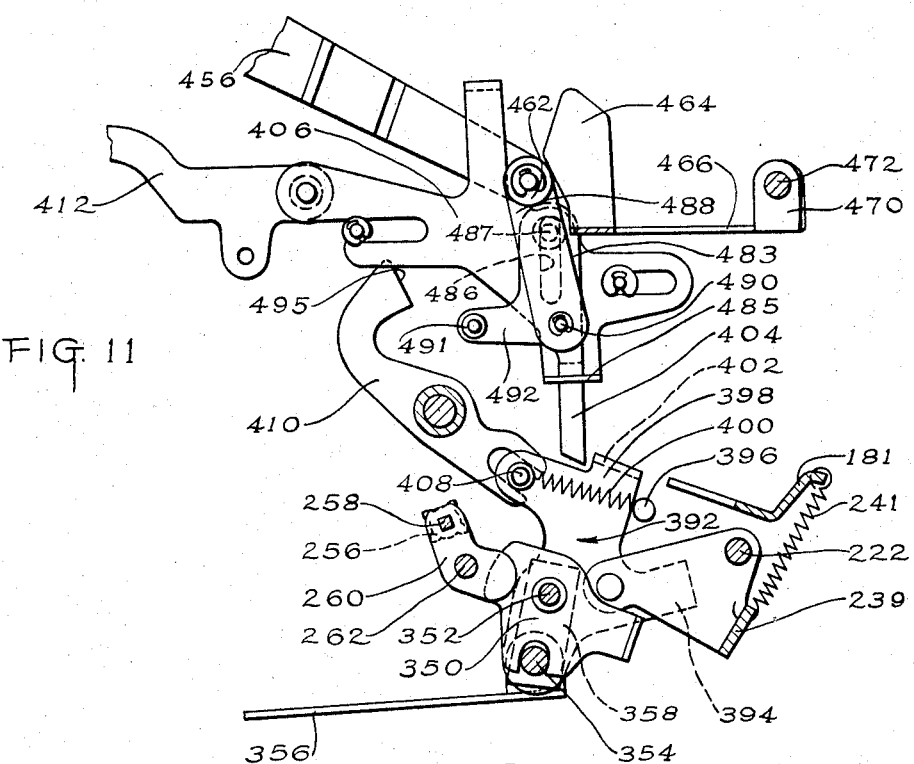
FIG. 11 is an enlarged view, taken along the line 11—11 of FIG. 2, looking in the direction of the arrows, showing the portion of the linkage used in multiplication by a negative multiplier.

The arm 404 is part of a T-shaped slide 483, mounted on the slide 406, and it extends through a flange 485 at the lower edge thereof and is guided at its top by a stud 487 extending through slot 486 (FIGS. 10 and 11). A link 488 connects the forward end of the lever 456 with a pivot connection 490 at the juncture between the crossbar of the T-slide 483 and a rearwardly projecting stem 492 thereof. When the lever 456 is pivoted in the clockwise direction by depression of the subtract slide 440, the T-shaped slide 483 is moved upwardly to bring the stem 492 and a stop pin 491 into alignment with the end of the hook shaped lever 410 to arrest the counterclockwise movement thereof to prevent movement of the slide 406 rearwardly of the machine for the purpose of operating the mechanism to move the C register to subtract position. Lifting of the arm 404 also clears the sideward extension 402 on the arm 398 of the multiple arm element 392, permitting a full stroke of the link 356. This insures that with a negative multipler the C register will be in the proper add or subtract position, depending on whether the multiplication is by repetitive addition or short cut by repetitive subtraction, leading, however, to a credit balance product.

Totaling out "C" register

During totaling out of the C register at the end of multiplication by a negative multipler, the credit balance mechanism 494 shown partially in FIG. 5, is operated from the cam 496 on the main shaft 114. This mechanism is more fully illustrated in the aforementioned Patent No. 2,834,542, FIG. 65.

Function selection

Referring to FIG. 6, there is illustrated the multiply-add-subtract-divide selector key 46 which is connected to an indicator slide 498 mounted on the outer left frame member 50. For multiplication, the key 46 is pushed rearwardly or to the right in FIG. 6, drawing the slide 498 rightwardly. At its forward end the slide carries a pin 500 which engages an L-shaped lever 502 which is pivoted at 504 on the calculating section frame and which has its opposite end positioned to engage a flag 506 on a pivoted control pawl 508 to move it out of the way of an escapement gear 510 fixed to the shaft 258, permitting free rotation of this shaft in either direction, thereby immobilizing the add back escapement arm 512 during short cut multiplication. This add back escapement arm 512 is useful only during division to restore into the C register the digit over-subtracted therefrom at the end of counting out of the C register during normal division problems.

Operation—positive multiplier

The operation of this calculating machine will now be described, first with respect to multiplication of positive numbers.

With the machine cleared of any numbers in the A, B and C registers, the selector key is moved rearwardly to the multiplication position. This action conditions the machine for multiplication by shifting the cam shaft 116 rightwardly (FIG. 2) a distance of about .050" to bring the cams programming the multiplication cycles into operative position. The mechanism for accomplishing this shifting, as well as the control cams, are more fully disclosed in the aforementioned Patent No. 2,834,542. At the same time, the add back escapement arm 512 is immobilized to condition the machine to count out of the C register when the multiplication is being carried out by the short cut method.

The multiplicand is entered into the B register by sequentially depressing the number keys 24, by reading the multiplicand from left to right, in the ten key machine illustrated. In a full keyboard machine, the appropriate key is depressed for each denominational order used. The motor bar 32 is depressed to energize the motor and through the mechanism shown in the aforementioned Patents Nos. 2,834,542 and 2,984,412, the multiplicand is entered into the B register. The bail 99 is moved to release the racks 68 and rack bars 124 to move rearwardly under the force of the springs 101 until the abutments 70 engage the stop pins 62 or move to zero position. The B register pinions are moved into engagement with the teeth of the rack bars 124. By this time the main shaft 114 will have been rotated its maximum distance through an angle of nearly 100°. On the return rotation of the main shaft 114, the bail 99 moves to the FIG. 3 position, restoring the racks 68 and rack bars 124 to their forward or retracted position. During this movement the pinions 118 of the B register are rotated through angles corresponding to the digit to be entered in each denominational order, and then the B register is disengaged from the rack bars and the bar detent 148 moved into pinion locking position. At the midpoint of this cycle the multiplicand is printed on the tape.

The multiplier is similarly entered into the machine, and specifically into the A register, by depressing the appropriate number keys 24 and then the motor bar 32. The bail 99 releases the racks 68 and rack bars 124 for rearward movement to abut the stops 70 against the depressed stop pins 62. At the midpoint of the main shaft cycle, the multiplier is printed onto the tape and the pinions 138 of the A register are engaged with the racks 124. As the bail 99 restores the racks and rack bars to their forward positions, the digits for each denominational order are entered into the A register. As described thus far, the machine functions as set forth in the aforementioned Patents Nos. 2,834,542 and 2,984,412.

The rearward travel of the rack bars 124 is determined by which of the stop pins 62 is depressed for any one denominational order, and the lower the value of the entered digit, the shorter the rack bar travel (FIG. 13). If the digit value is 5 or less, the rearward movement of the rack bar 124 is insufficient to clear the flanged face 190 of the pusher 186, and thus when the rack bar is returned to the stop 218, the corresponding lever 178 is not actuated and the advancing pawl 170 is not released. However, if the digit has a value of 6 or greater, the rearward travel of the rack bar 124 will clear the flanged face 190 of the pusher 186 and the spring 194 will move it into blocking position as shown in FIG. 13. During the forward movement of the rack bar 124, when the A register pinions 138 are engaged with the rack bars 124, the end 210 of the rack bar engages the pusher end and drives the pusher forwardly to pivot the lever 178 in the counterclockwise direction (FIGS. 13 and 14), thereby releasing the advancing pawl to engage its finger 172 with the pinion 138 of the next higher denominational order. As the A register is moved from engagement with the rack bars 124, each pinion 138 engaged by a finger 172 is advanced in the counterclockwise direction by one. Each rotated lever 178 is held in its latched position by its latch 220 until the conclusion of the calculating cycles.

For example, if the multiplier entered into the A register is 394786 from the keyboard, it will be printed on the tape in this manner. During the movement of the A register from the rack bars 124, each digit to the left of 9, 7, 8, and 6, respectively will be increased by 1, so that the modified multiplier in the A register is 495896 prior to starting the calculating strokes.

It should be noted from a comparison of FIGS. 12, 13, and 14, that whenever the digit entered from the keyboard is 5 or less, the lever 178 corresponding to the denominational order is not moved (FIG. 12), but when the entered digit is 6 or greater, the lever is rocked to latched position to condition the mechanism to subtract from the C register.

Inasmuch as the B register controls the counting out or clearing of the A register by the count gear 256 from the highest to the lowest denominational order, it should be noted that, using the modified multiplier as given above, the following successive steps will take place for the appropriate denominational orders during the calculating cycle of the machine:

The multiplicand is added into the C register four times;

The multiplicand is subtracted from the C register once;

The multiplicand is added into the C register five times;

The multiplicand is subtracted from the C register twice;

The multiplicand is subtracted from the C register once;

The multiplicand is subtracted from the C register four times.

On the next cycle the B register is cleared and the zero notation is printed on the tape, and on the last cycle the C register is cleared and the product printed on the tape.

The positions of the levers 178 determine whether the machine strokes add into or subtract from the C register by blocking (FIG. 12) or passing (FIG. 14) the subtract selector element 350.

With the given multiplier, the lever 178 corresponding to the sixth column, remains in the FIG. 12 or blocking position. The driving arm 384 which is powered on every stroke of the machine drives the plate 356 forwardly to rock the selector element 350 about its pivot. The latter's movement is arrested by engagement with the lever foot 348, which also arrests the movement of the multiple arm element or lever 392 so that it does not move the slide 406 rearwardly to actuate the linkage which moves the C register pinions 92 and 94 from the add to the subtract position. The count arm 272 (FIGS. 4 and 5) is moved by the slide 290 to the position where the foot 270 rotates the shaft 258 in the clockwise direction (counterclockwise direction as seen in FIGS. 18 to 20). On each stroke of the machine the sixth column pinion 138 is rotated in the clockwise direction by the pinion 256 a distance of one tooth. The machine continues stroking for four strokes and the multiplicand is added into the register four times in the sixth column.

On the last stroke one of the lateral lugs 144 engages the stop face 162 of the stop pawl 152 to retract it to the position shown in FIG. 18, thus releasing the escapement dog 158 so that the B register may escape to the next lower denominational order, or the fifth column in the given problem.

The digit entered into the fifth column from the keyboard is 9, and consequently the value of the digit in the sixth column was raised from 3 to 4, as previously noted. In entering 9 in the fifth column, the rack bar 124 corresponding thereto moved rearwardly sufficiently to clear the rear face of the pusher 186, which was dropped into blocking position by the spring 194 and moved forwardly upon the return or forward stroke of the rack bar. The forward movement of the pusher moved the lever 178 to the FIG. 14 position, where it was held by the latch 220. It also released the pawl 170 to advance the pinion 138 in the sixth column one tooth to increase the value of the multiplier in that column from 3 to 4.

With the lever latched in the FIG. 14 position, the next stroke of the drive arm 376 will drive the plate 356 through a full stroke and will rotate the subtract selector element 350 past the foot 348 of the lever 178 and the multiple arm element or lever 392 sufficiently to engage the depending arm 404 of the slide 406 to move them rearwardly. Consequently, the link 412 is moved rearwardly to engage the subtract hook 416 with the stud 420 on the lever 422 (FIG. 10). The lever is pivoted in the clockwise direction by the subtract cam 428 mounted on the main shaft and through the arms 432, 434, and 438 shifts the arm 334 of the accumulator or C register to the subtract position (FIG. 5). The movement of the C register to subtract position shifts the link 328 forwardly to pivot the arm 332 of the yoke 306 in the counterclockwise direction. This movement presents the stop shoulder 314 on the yoke arm 308 for engagement with the sensing finger 320 and thus limits the rearward movement of the slide 290 to align the foot 268 of the count arm with the studs 266 on the disc 264. On this stroke of the machine the shaft 258 is rotated in the counterclockwise direction the distance of one tooth to move the pinion 138 from the 9 to the 0 position. At the same time, the multiplicand is subtracted from the C register or accumulator in the fifth column.

This action in the A register is illustrated in FIG. 20, which shows the tooth lug 144 engaging the cam surface 164 on the pawl 154 to cam the latter downwardly and out of the way of the stop dog 158 carried by the B register. This retraction of the stop pawl permits the B register to escape to the next lower denominational order, which in the given problem is the fourth column.

In the multiplier of the problem given, the digit entered into the fourth column from the keyboard was 4, and the machine function dictated by the position of the lever 178 corresponding to the fourth column is one of multiplication by repetitive addition of the multiplicand into the C register. Since the digit entered into the third column was greater than 5, namely 7, the value of the digit in the fourth column was increased by 1 to 5. The machine in the calculating cycle will stroke five times to count out the A register and add the multiplicand into the C register five times.

Subsequently, the multiplicand will be subtracted from the C register twice in the third column, once in the second column, and four times in the first column, according to the difference between the adjusted value of the digit in the columns and 10.

Figure 15:
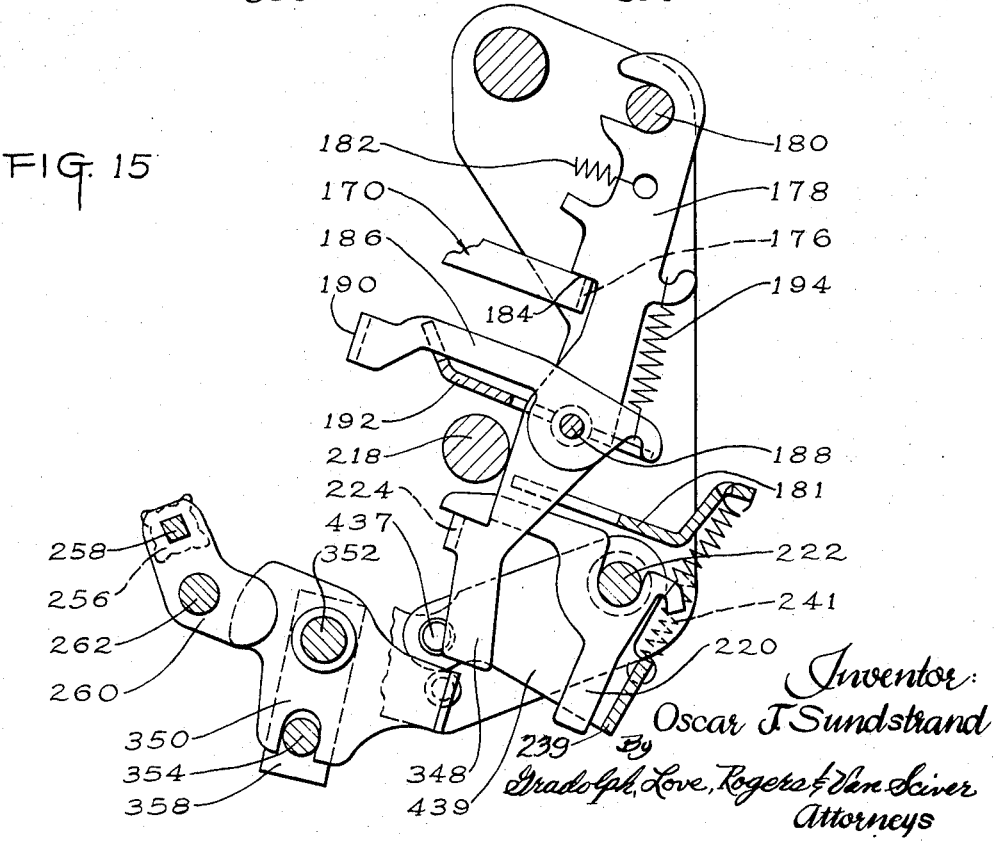
FIG. 15 is an enlarged sectional view through the forward end of the calculating section, showing the elements for restoring the parts to the FIG. 12 position.

After the A register has been cleared or counted out to zero for all of the pinions 138, the B register is cleared in the next or fourth machine cycle. On this cycle the B register pinions 118 are returned to zero position as more fully explained in the aforementioned Patents Nos. 2,834,542 and 2,984,412, and this information is printed on the tape. Also, the bail 239 is swung inwardly against the latches 220 to release any of the levers 178 held in the subtract position. This action is accomplished by the movement of the subtract control element in the counterclockwise direction to move the stud 437 and lever 439 in the clockwise direction (FIG. 15). At the same time the bail 238 presses the advancing pawls 170 downwardly to move them away from their stops 212 or 184. The previously latched levers 178 are returned by their springs 182 to the normal or FIG. 12 position, and the pawls 170 are engaged under the shoulders 184 by the springs 174. The calculating section of the machine is conditioned to receive another problem.

On the next and last machine cycle, the C register or accumulator is totaled out and the product printed on the tape.

Should the digit entered from the keyboard into a column be 5 and the digit entered into the next lower denominational column be greater than 5, then the first mentioned digit will have its value increased to 6 and the machine will perform six strokes of repetitive addition in that column during the calculating cycle. This phenomenon occurs because the movements of the advancing pawls 170 have no effect on the movements of the racks 68 and rack bars 124 during entry of the multiplier from the keyboard into the A register.

If the adjusted digit in any A register column be 0, then the B register will escape past this column as the stop pawl 154 corresponding thereto will be held out of the path of the B register stop dog 158 by engagement of the pinion lug 144 with the stop face 162 (FIG. 18) or with the cam surface 164 (FIG. 20). Whenever the digit 9 is entered into a column and subsequently raised by the advancing pawl by 1, the adjusted value of the digit for that column becomes 0, and the B register escapes past the column during counting out of the A register. The machine, therefore, performs no idle or nonfunctional strokes during the calculating cycle.

Operation—negative multiplier

If the multiplier entered into the machine is negative, the numerical value of the product will be the same as for a positive multiplier, but the credit balance mechanism will cause the printed product to be shown as a credit total or "TC." To enter a negative multiplier, the numeral keys 24 are appropriately sequentially depressed and the subtract key 34 is depressed. Depressing this key moves the subtract slide 440 (FIG. 10) downwardly so that the pin or stud 442 is engaged by the hooked latch 444, which also engages its stud 455 with the subtract hook 416 to swing the latter into position to be engaged by the pin 420 carried on the lever 422. When the key 34 and slide 440 are moved downwardly they are latched in depressed position by a latch (not shown) engaging a long pin 441 carried by the slide and extending rightwardly thereof as disclosed in the aforementioned Patents Nos. 2,834,542 and 2,984,412. They are retained in this position until the end of the third or calculating cycle of the machine.

The subtract cam 428 is rotated in the counterclockwise direction to engage the pin 420 with the subtract hook 416, thereby to shift the C register to subtract position in the manner previously described. In order to preserve the short cut method of multiplication for a negative multiplier, the manner of counting out the A register must be adjusted to compensate for the fact that a credit balance or "TC" product is to be taken. This compensation is effected by bringing the stop shoulders 318 and 316 into position to be engaged by the sensing finger 320 carried by the slide 290. These shoulders are oppositely arranged from the shoulders 312 and 314 used during multiplication by a positive multiplier. All of the stop shoulders are carried on the yoke 306 which is shifted leftwardly by the rod 472 under the action of the lever 466 and the cam 464, the latter being moved by the roller 462 carried on the forward end of the pivoted lever 456 rocked by depressing the key 34 and the slide 440.

The lever 456 also raises the T-shaped slide 483 on the slide 406 to remove the depending arm 404 out of the path of the multiple arm element 392 and the pin or stud 491 into position to be engaged by the hooked lever 410.

Thus, at the outset of the third or calculating cycle of the machine, the C register is conditioned for a subtract operation and the taking of a credit balance or "TC" product. Also, the linkage controlling the short cut multiplication functions are conditioned to sense the position of the levers 178 and properly to position the count arm 272.

During the machine strokes, the A register is counted out in a manner reverse to that in which it was counted out during multiplication by the positive multiplier. Thus, at the start of each stroke in the calculating cycle, the slide 250 is moved forwardly and moves the slide 290 forwardly to withdraw the sensing finger 320 from the shoulders 316 and 318. On the return stroke, the slides 250 and 290 will move rearwardly to bring the sensing finger into engagement with the shoulder 316 or the shoulder 318, depending on whether the function is addition into or subtraction from the C register or accumulator.

Assume again that the multiplier has the numerical value of 394786 entered from the keyboard. This multiplier will have an adjusted value of 495896 by the action of the advancing pawls 170 as the A register moves away from the rack bars 124. This multiplier, however, will be counted out from the A register in a manner reverse to that in which the previously discussed positive multiplier was counted out, from left to right, thusly:

The multiplicand is subtracted from the C register four times;
The multiplicand is added into the C register once;
The multiplicand is subtracted from the C register five times;
The multiplicand is added into the C register twice;
The multiplicand is added into the C register once;
The multiplicand is added into the C register four times.

On the succeeding two machine cycles, the B register is cleared of the multiplicand and this fact printed on the tape and the C register is totaled out and the credit balance or "TC" product is printed on the tape.

As previously noted, the multiplicand and multiplier are entered into the B and A registers, respectively, the latter by depressing the subtract key 34. The subtract key and the slide 440 are latched in depressed position and the C register is moved from its normal add to subtract position. The lever 456 is rocked in the clockwise direction, thereby shifting the rod 472 leftwardly and bringing the shoulders 316 and 318 into position to be engaged by the sensing finger 320. Since the subtract hook 416 is rocked in the counterclockwise direction by depression of the subtract key (FIG. 10), the link 412 and slide 406 are moved rearwardly to subtract position. The lever 456 lifts the arm 404 out of position to be engaged by the multiple arm element 392 and it moves the pin into position to be engaged by the face 493 on the hook 410.

The racks 64 and rack bars 124 will move rearwardly under the force of the springs 101 and in every column where the digit entered is greater than 5, the forward face of the rack bar 210 clears the flanged end of the corresponding pusher 186 so that the corresponding lever 178 is rocked to and latched in the FIG. 14 position. The advancing pawl 170 advances the A register pinion in the next higher denominational order the digit value of 1.

The A register is cleared or counted out from the highest to the lowest denominational order and from left to right as the multiplier is visualized. In the given example, where the adjusted value of the multiplier is 495896, the B register will escape to the sixth column where the entered digit was 3 and the adjusted or advanced value is 4. Since the lever 178 for the sixth column was not rocked by its pusher 186, its foot 348 remains in blocking position with respect to the subtract selector element 350, and the multiple arm lever 392 and the hook 410 are not moved appreciably from their FIG. 10 positions. This means that the C register or accumulator will remain in the subtract position and the sensing finger 320 will engage the shoulder 318 to position the count arm 272 to count out the A register by rotating the disc 264 one-quarter of a revolution in the counterclockwise direction, FIGS. 4 and 5, or in the clockwise direction, FIGS. 18 to 20. The multiplier is counted into the C register or accumulator on the negative side. It may also be said to be subtracted from the C register or accumulator. The machine strokes four times in the sixth column and the multiplier is entered into the C register or accumulator four times on its negative side.

When the machine stroking in the sixth column has been concluded, the B register escapes to the fifth column where the value of the entered digit was 9, as is its adjusted value. The rack bar 124 for the fifth column had been moved rearwardly to the 9 position, and the corresponding pusher 186 had dropped into position to be engaged by the rack bar on its return or forward stroke and thus to rock the fifth column lever 178 to its latched position. In this position the foot 348 is removed from blocking position to permit the multiple arm lever 392 to swing the hooked arm 410 in the counterclockwise direction against the pin 491, forcing the slides 483 and 406 forwardly to draw the link 412 forwardly, thereby rotating the subtract hook 416 in the clockwise direction to release the C register or accumulator to its positive or add position. This movement positions the slide 290 to engage the sensing finger 320 with the shoulder 316 to count out the A register by rotating the disc 264 in the clockwise direction, FIGS. 4 and 5, or the counterclockwise direction, FIGS. 18 to 20. The multiplicand is entered into the positive or add side of the C register or accumulator and the A register pinion for the fifth column is moved from the 9 to the 0, by counterclockwise rotation, thereby bringing the lug 144 against the face 164 of the escapement pawl 154 to depress it from the path of the escapement dog 158. The B register escapes or moves to the fourth column.

Since the key 34 and slide 440 are locked in depressed condition as soon as the arm 410 moves to its normal or FIG. 10 position, the C register or accumulator is returned to the subtract or negative position, and counting out the A register continues. For the fourth column it is counted out into the subtract or negative side of the C register. For the third, second, and first columns, it is counted out into the add or positive side of the C register in the manner described for the fifth column, but with two, one, and four machine strokes respectively. At the conclusion of the third machine cycle, the levers 178 are restored to their original position in the manner previously described, and in the fourth and fifth machine cycles the B register is counted out and zeros printed on the tape to indicate this and the C register is totaled and the credit balance or "TC" product is printed on the tape.

From the foregoing description, it will be appreciated that the objectives claimed for this invention at the outset of this specification are attained by the disclosed structure.

While a preferred embodiment of the printing calculating machine incorporating mechanism for short cut multiplication has been shown and described, it will be apparent that modifications and variations thereof may be made without departing from the underlying principles of the invention.

What is claimed as new and desired to be secured by United States Letters Patent is:

1. In a calculating machine having a plurality of numeral keys, a group of function control keys, a function selector key, an accumulator shiftable between add and subtract positions, a first register to receive the multiplicand set up by the numeral keys in a problem of multiplication, a second register to receive the multiplier set up by the numeral keys in such problem, a reciprocable actuator for each column for entering the amounts from the numeral keys into the first and second registers and for transferring the multiplicand into the accumulator during counting out of the second register under the control of the first register during the calculating cycle, and a main shaft, the improvement comprising, (a) a movably mounted actuator movement sensing means associated with each actuator and adapted to be moved a predetermined distance whenever its respective actuator is moved a distance representative of the value of an entered number in the multiplier greater than 5,
        (i) stop means carried by said movably mounted means and movable between a blocking position when said movably mounted means has not been moved and an unblocking position when said movably mounted means has been moved by its respective actuator,
    (b) (1) a latch for each of said movably mounted means to hold said means in moved position,
    (c) advancing means for each number column other than the units column normally engaged by and held in restrained position by said unmoved actuator movement sensing means in the next lower number column,
   (i) means moving said advancing means when released to advance the second register an amount equal to the number 1 in the column corresponding to said released advancing means,
(d) movably mounted subtract selector means movable transversely of the first register during counting out of the second register under the control of the first register, said subtract selector means being adapted to be restrained against movement by said stop means only when said stop means is in blocking position,
(e) drive means including a spring biased lost motion means connected to move said subtract selector means on each stroke of the machine during counting out of the second register, and
(f) a linkage connected to and operated by said drive means to shift the accumulator to subtract position upon movement by said drive means of said subtract selector means.

2. A calculating machine as claimed in claim 1, wherein
(a) said movably mounted means includes
   (ii) a pivotally mounted lever,
   (iii) a pusher pivotally mounted on said lever and arranged to be engaged by its respective actuator when the latter is moved a distance representative of the value of an entered number in the multiplier greater than 5 so as to pivot said lever to latched position, and
   (iv) spring means biasing said lever in unlatched position against a stop.

3. A calculating machine as claimed in claim 1, wherein
(a) said movably mounted means includes
   (ii) a movably mounted lever, and
   (i) said stop means comprises the lower end of said lever which is movable from blocking position to unblocking position when said lever is moved in response to the entry of a number into the multiplier greater than 5.

4. A calculating machine as claimed in claim 2, wherein
(a) (iii) said pusher comprises a lever having a flanged end adapted to be engaged by the forward end of its respective actuator when the latter has been moved a distance corresponding to a number greater than 5 during entry of the multiplier from the keyboard, spring means biasing said pusher lever into position to be engaged by its respective actuator, and means to hold said pusher out of engagement by its respective actuator except when a number is being entered into the second register.

5. A calculating machine as claimed in claim 4, wherein said machine includes a cam shaft and
(a) (iii) said means to hold said pusher lever out of engagement by its respective actuator comprises a pivotally mounted comb for all said pushers, linkage means normally holding said comb against the force of said biasing means to position said pushers out of actuator engaging position, a cam on said cam shaft engaging said linkage means to move the latter to comb releasing position, and a latch normally holding said comb against movement and movable by the second register as it moves to release said comb.

6. A calculating machine as claimed in claim 1, wherein
(a) said movably mounted means includes
   (ii) a pivotally mounted spring biased lever normally held against a stop,
   (iii) a pusher pivotally mounted on said lever and arranged to be engaged by its respective actuator when the latter is moved a distance representative of the value of an entered number in the multiplier greater than 5,
   (v) said lever having a shoulder thereon, and
(c) said advancing means includes
   (i) a pivotally mounted pawl having one end normally engaging said shoulder on said lever when the latter is in unmoved position,
   (ii) a second end positioned to engage the second register in the next higher number column to advance the second register by the number 1 when said pawl is released from said lever shoulder, and
   (iii) means biasing said pawl in a direction to engage said shoulder and to advance the second register.

7. A calculating machine as claimed in claim 1, including
(c) (iv) a bail movable on every stroke of the machine to engage all of said pawls and to move them to shoulder engaging position to permit the restoration of unlatched levers against said stop and the reengagement of said pawls with said shoulders.

8. A calculating machine as claimed in claim 1, wherein
(a) said movably mounted means includes
   (ii) a pivotally mounted spring biased lever normally held against a stop,
   (iii) a pusher pivotally mounted on said lever and arranged to be engaged by its respective actuator when the latter is moved a distance representative of the value of an entered number in the multiplier greater than 5,
   (vi) said lever having an ear thereon, and
(b) said latch includes
   (i) a pivotally mounted member having a hooked end normally resting on said lever ear, said end engaging said ear to latch said lever when the latter is pivoted by said pusher, and
   (ii) spring means biasing said pivotally member to latching position.

9. A calculating machine as claimed in claim 8, including
(b) (iii) a pivotally mounted release bail engageable with all of said pivotally mounted latch members and movable by the engagement therewith of said subtract selector means (d) under the impetus of said drive means (e) to pivot said latch members out of latching position at the end of the calculating cycle of the machine, and
   (iv) spring means normally holding said bail out of engagement with said latch members.

10. A calculating machine as claimed in claim 1, including
(b) (iii) means engageable with all said latches and operated by said drive means (e) to release said latches at the end of the calculating cycle of the machine.

11. A calculating machine as claimed in claim 1, wherein
(a) said movably mounted means includes
   (ii) a pivotally mounted spring biased lever normally held against a stop,
   (iii) a pusher pivotally mounted on said lever and arranged to be engaged by its respective actuator when the latter is moved a distance representative of the value of an entered number in the multiplier greater than 5,
   (i) one end of said lever constituting said stop means, and
(d) said movably mounted subtract selector means includes
   (i) a multi-arm subtract selector element,
   (ii) means pivotally mounting said subtract selector element for transverse movement with the first register,
   (iii) and means connecting said drive means (e) to one arm of said subtract selector element.

12. A calculating machine as claimed in claim 11, wherein (d)(ii) said means pivotally mounting said subtractor element comprises a shaft on which said element is longitudinally slidable, and (iii) said means connecting said drive means to said subtract selector element comprises a second shaft slidably connected to said one arm of said element, pivotally mounted on said first shaft on a pair of levers, and connected to said drive means.

13. A calculating machine as claimed in claim 1, having a power means and a cam shaft driver thereby wherein, (a) said movably mounted means includes
(ii) a pivotally mounted spring biased lever normally held against a stop,
(iii) a pusher pivotally mounted on said lever and arranged to be engaged by its respective actuator when the latter is moved a distance representative of the value of an entered number in the multiplier greater than 5,
(i) one end of said lever constituting said stop means, and (e) said drive means includes
(i) a drive plate having one end connected to said subtract selector means and to said linkage connected to shift the accumulator, and
(ii) a driving member connected to be driven by the power means and including a spring biased lost motion connection engageable with the other end of the plate on each stroke of the machine during the calculating cycle to drive said drive plate, said subtract selector means and said linkage.

14. A calculating machine as claimed in claim 13, wherein
(e)(ii) said driving member comprises a driving arm freely rotatable on a power shaft, a crank arm fixed on said shaft to be driven thereby, a stop lug carried by said crank arm, and a spring biasing said driving arm against said stop lug whereby said crank arm may move relative to said driving arm in the driving direction should the movement of the drive plate be arrested.

15. A calculating machine as claimed in claim 13, including
(e)(iii) means holding said drive plate out of the driving movement path of said driving member, and
(iv) cam means carried by the cam shaft and movable into position thereby during the calculating cycle of the machine to move said holding means so as to present said drive plate to be driven by said driving member.

16. A calculating machine as claimed in claim 15, wherein
(e) (iii) said holding means comprises a pivotally mounted bell crank lever having one arm engaging the surface of said plate, a spring holding said plate against said arm, a second arm in the path of movement of said second arm, and second spring means biasing said bell crank to hold said plate out of the path of driving movement of said driving member.

17. A calculating machine as claimed in claim 1, wherein one of said function control keys is a subtract key and having a mechanism operated from the subtract key to enter negative numbers into the accumulator and to provide a negative multiplier in the second register, including (f) a linkage system connected to and actuated by the subtract key to cause said subtract selector means to cause shifting of the accumulator to accept positive numbers when said subtract selector means is not blocked by said actuator movement sensing means.

18. A calculating machine as claimed in claim 17, wherein (f) said linkage system includes
(i) a pivotally mounted lever connected to and operated by the subtract key when the latter is depressed,
(ii) a slide movable by said pivotally mounted lever out of the path of rotation of movement of said subtract selector means when the latter is not blocked in its movement,
(iii) a pivotally mounted member rocked by said subtract selector means when the latter moves through a full stroke and engageable with said slide, and
(iv) a link connected to said slide and to said accumulator shifting means to operate the latter to receive positive numbers.

19. A calculating machine as claimed in claim 1, including a count arm operated on every stroke of the machine to operate the second register in counting out direction either by addition into or subtraction from the accumulator, (g) a linkage connected to be operated on every stroke of the machine to position the count arm to count out the second register in the proper direction, and
(h) other linkage connected to position said last named linkage (g) and controlled by the position of said movably mounted means (a) and by the function control key entering a negative multiplier into the second register to insure counting out the second register in the proper direction.

20. A calculating machine as claimed in claim 19, wherein
(h) said other linkage includes
(i) a movement controlling stop,
(ii) linkage connected to be operated from said drive means (c) and controlled from the position of said movably mounted means (a) and the subtract function control key to position said movement controlling stop.

21. A calculating machine as claimed in claim 20, wherein
(h) (iii) said stop is connected to control the movement of a slide connected to the count arm to determine whether the second register is counted out by addition into or subtraction from the accumulator.

References Cited

UNITED STATES PATENTS

| 2,992,773 | 7/1961 | Capellaro et al. | 235—60 |
| 3,001,701 | 9/1961 | Fröbel | 235—63 |
| 3,032,261 | 5/1962 | Lyofors | 235—60 |
| 3,037,691 | 6/1962 | Kühn | 235—60 |
| 3,212,705 | 10/1965 | Chall et al. | 235—60 |
| 3,369,744 | 2/1968 | Barozzi et al. | 235—60 |
| 3,374,946 | 3/1968 | Haberkorn | 235—60 |

RICHARD B. WILKINSON, Primary Examiner

STANLEY A. WAL, Assistant Examiner